United States Patent
Alomari et al.

(10) Patent No.: US 12,461,844 B2
(45) Date of Patent: Nov. 4, 2025

(54) METHOD, APPARATUS, AND SYSTEM FOR DETERMINING RELATIVE IMPORTANCE OF COMPUTER CODE ANALYSIS ALERTS

(71) Applicant: SAUDI ARABIAN OIL COMPANY, Dhahran (SA)

(72) Inventors: Firas Alomari, Dhahran (SA); Abdullah A Thaafoud, Dammam (SA); Add El Belati, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 277 days.

(21) Appl. No.: 18/190,738

(22) Filed: Mar. 27, 2023

(65) Prior Publication Data
US 2024/0330168 A1 Oct. 3, 2024

(51) Int. Cl.
*G06F 11/3668* (2025.01)
*G06F 8/41* (2018.01)

(52) U.S. Cl.
CPC .......... *G06F 11/3692* (2013.01); *G06F 8/42* (2013.01)

(58) Field of Classification Search
CPC . G06F 8/42; G06F 8/423; G06F 8/425; G06F 8/427; G06F 11/3692
USPC .......................... 717/130, 104, 141, 142, 144
See application file for complete search history.

(56) References Cited

U.S. PATENT DOCUMENTS

| | | | |
|---|---|---|---|
| 8,479,188 B2 | 7/2013 | Singh et al. | |
| 9,128,728 B2 | 9/2015 | Siman | |
| 9,544,327 B1 | 1/2017 | Sharma et al. | |
| 10,776,497 B2 | 9/2020 | Wysopal et al. | |
| 11,036,614 B1 * | 6/2021 | Huang | G06F 11/3608 |
| 12,050,668 B1 * | 7/2024 | Soofi | G06F 21/14 |
| 2009/0044177 A1 * | 2/2009 | Bates | G06F 8/75 717/131 |
| 2019/0012155 A1 * | 1/2019 | Oey | G06F 8/443 |
| 2021/0318858 A1 * | 10/2021 | Xu | G06F 11/3636 |

(Continued)

OTHER PUBLICATIONS

Athos Ribeiro et al.; Ranking Source Code Static Analysis Warning for Continuous Monitoring of FLOSS repositories; 14th International Conference on Open Source Systems (OSS); https://hal.inria.fr/hal-01875492/document; Athens, Greece; Jun. 2018.

(Continued)

*Primary Examiner* — Wei Y Mui
*Assistant Examiner* — Amir Soltanzadeh
(74) *Attorney, Agent, or Firm* — Leason Ellis LLP

(57) ABSTRACT

A computing apparatus and method adapted to obtain an identification of computer code for analysis; retrieve the computer code based on the identification; generate an abstract program representation of the retrieved computer code; conduct execution behavior analysis of the computer code using the abstract program representation to generate a graphical representation of execution behavior for the computer code; obtain a plurality of alerts generated from one or more static code analysis processes that are performed on the computer code; compute respective alert metrics for the plurality of alerts using the abstract program representation and the graphical representation of execution behavior; rank the plurality of alerts by the computed alert metrics; and output a ranked list of the plurality of alerts.

16 Claims, 14 Drawing Sheets

(56) References Cited

U.S. PATENT DOCUMENTS

2023/0004361 A1* 1/2023 Moon .................... G06F 8/34
2023/0315408 A1* 10/2023 Kawanoue ......... G05B 23/0243
　　　　　　　　　　　　　　　　　　　　　　　717/144

OTHER PUBLICATIONS

Binh Hy Dang; A Practical Approach for Ranking Software Warnings from Multiple Static Code Analysis Reports; https://ieeexplore.ieee.org/abstract/document/9368277; Nov. 20, 2022.
Kien-Tuan Ngo et al.; Ranking Warnings of Static Analysis Tools Using Representation Learning; https://arxiv.org/pdf/2110.03296.pdf; Faculty of Information Technology, VNU University of Engineering and Technology, Vietnam; Retrieved Mar. 27, 2023.
Athos Ribeiro et al.; Ranking Warnings from Multipe Source Code Static Analyzers via Ensemble Learning; https://dl.acm.org/doi/abs/10.1145/3306446.3340828; Aug. 2019.
Tukaram Muske et al.; Survey of Approaches for Postprocessing of Static Analysis Alarms; https://dl.acm.org/doi/abs/10.1145/3494521; ACM Computing SurveysVolume 55Issue 3Article No. 48pp. 1-39h; Oct. 2020.
Firas Alomari et al.; Scalable Source Code Similarity Detection in Large Code Repositories; EAI Endorsed Transactions on Scalable Information Systems; https://eudl.eu/doi/10.4108/eai.13-7-2018.159353; vol. 6; Issue 22; Jun. 2019-Jul. 2019.

* cited by examiner

1325

1310

METHOD, APPARATUS, AND SYSTEM FOR DETERMINING RELATIVE IMPORTANCE OF COMPUTER CODE ANALYSIS ALERTS

FIELD OF THE DISCLOSURE

The present disclosure generally relates to computer code analysis tools and, more specifically, to a novel technique for prioritizing automated software analyses.

BACKGROUND OF THE DISCLOSURE

With the continual development, proliferation, and increased complexity of computer systems, the amount of software code under development and in need of review continues to multiply. Static analysis tools, such Static Code Analysis (or Source Code Analysis) (SCA) tools, have been developed and used to automatically find potential bugs and security vulnerabilities in source code without executing the code. However, these automated tools can generate very large numbers of issue alerts, including false positives, due to their different analysis techniques. As a result, developers are often compelled to spend considerable time screening out significant issues from large numbers of reported warnings, which is time-consuming, subjective, and inefficient.

Static code analysis (SCA) is the process of analyzing the source code of a program for flaws without executing the program. SCA tools examine source code to identify potential flaws that can jeopardize the functional and security integrity of program code. The result of an SCA examination usually includes a collection of alerts (e.g., possible defects) that contain source code locations (file path and line number, for example) and a textual description of each alert. Additional contextual information, such as example execution paths and variable values that may trigger the undesired behavior identified by the alert may also be included in an SCA report.

Various types of Static Analysis may leverage different strategies and techniques to identify potential alerts and bugs that involve model checking, pattern matching, symbolic execution, and dataflow analysis. These strategies specialize in certain types of defects that lend themselves better to specific analysis techniques. Therefore, static analysis tools scan the source code using one or more of these techniques to increase the number of vulnerability types covered and provide a more comprehensive analysis of the code. Additionally, static analyses that rely on heuristics and approximations to identify issues require tradeoffs related to completing the analyses in a reasonable amount of time and with a reasonable use of computational resources. Consequently, automated code analyses often rely on different techniques that result in large numbers of alerts that can include too many false positives due to the imprecision in some static analyses.

These limitations in static code analysis are a major concern for software and quality assurance professionals. On one hand, static analysis tools must provide adequate and comprehensive coverage against a variety of code defects. On the other hand, these tools must also avoid generating an excessive number of false positives. As a result, the benefits of static analysis has gradually diminished as new analysis techniques are continually added to cover new defect types. In some cases, covering these additional defects can cost more in evaluation (e.g., involving false positives) than any potential costs resulting from an underlying defect (e.g., minor defects).

Indeed, recent experience suggests that static analysis tools are not being used effectively even when readily available because the excessive number of false positives often hinders their use for their intended purposes efficiently. For example, operators and developers are often confronted with large numbers of alerts reported by the static analysis tools and, thus, find it difficult to evaluate every generated alert in order to ensure the underlying code is adequately fixed. Additionally, the evaluation typically requires manual inspection that is tedious and prone to human error, which is often due to having a significant portion of the alerts and warnings found to be false positives. Consequently, a significant toll is imposed on development teams that are required to review a vast number of false positives before finding an actionable alert. Developers, thus, often shy away from making use of static analysis results due to the effort required to review all of the alerts. Indeed, developers can, on occasion, reject static analysis results completely and choose not to review any alerts at all, especially in cases where a majority of initial cases turn out to be false positives or insignificant.

SUMMARY OF THE DISCLOSURE

SCA tools generating too many alerts is a well-known problem and there have been developments on methods to prioritize or rank reported alerts to allow developers to focus on more highly prioritized alerts and to possibly ignore lower priority alerts to save time and resources. However, current ranking and prioritization methods are based on simple severity or confidence levels that are oblivious to the actual code being analyzed and, therefore, fail to consider other additional contextual information, such as code criticality and execution likelihood of the code. As such, these prioritization methods can result in focusing on less significant alerts or missing opportunities to fix important defects.

In view of the aforementioned shortcomings of SCA tools and available prioritization methods, the present disclosure presents a novel ranking and prioritization approach to reorder the results of automated code analyses by ranking the more significant issues on top and suppressing or lowering the ranking of less significant issues, so that real issues existing in the programs can be more easily found and fixed by the developers.

In order to prioritize various kinds of issues and enhance the performance of the tools, Control Flow Graphs (CFGs) and Program Dependence Graphs (PDGs) are dynamically extracted to compute a number of relevant metrics for the underlying source code, including execution likelihood, data flow analysis, and centrality. These metrics are then combined with user predefined objectives to capture competing priorities to provide a way of trading off between the different identified issues and highlight the most relevant issues for the analysts.

According to an example implementation consistent with the present disclosure, a computing apparatus, comprises: one or more processors; and a memory having stored therein machine-readable instructions that, when executed by the one or more processors, cause the one or more processors to: obtain, from a user via a user interface, an identification of computer code for analysis; retrieve, from a memory storage device, the computer code based on the identification obtained from the user; generate an abstract program representation of the retrieved computer code; conduct execution behavior analysis of the computer code using the abstract program representation to generate a graphical representation of execution behavior for the computer code;

obtain a plurality of alerts generated from one or more static code analysis processes that are performed on the computer code; compute respective alert metrics for the plurality of alerts using the abstract program representation and the graphical representation of execution behavior; rank the plurality of alerts by the computed alert metrics; and output, to the user via the user interface, a ranked list of the plurality of alerts.

According to an example implementation, for generating the abstract program representation, the machine-readable instructions, when executed by the one or more processors, cause the one or more processors to: convert the retrieved computer code to a stream of source code text; tokenize the converted text stream into a plurality of tokens; assign respective context indicators to the tokens; and generate an abstract syntax tree using the tokens with the assigned context indicators, said abstract syntax tree representing the abstract program representation.

According to an example implementation, for the execution behavior analysis, the machine-readable instructions, when executed by the one or more processors, cause the one or more processors to: determine a control flow of the retrieved computer code using the abstract program representation to generate one or more control flow graphs; identify one or more data dependencies among a plurality of nodes in the one or more control flow graphs to generate corresponding one or more program dependence graphs; and generate a code graph representation of a system associated with the retrieved computer code using the one or more program dependence graphs, said code graph representation being used as the graphical representation of execution behavior to compute the respective alert metrics.

According to an example implementation, the code graph representation is generated using one or more call graphs derived from an abstract syntax tree comprised in the abstract program representation.

According to an example implementation, for computing the respective alert metrics, the machine-readable instructions, when executed by the one or more processors, cause the one or more processors to: compute one or more possible execution paths for each of the plurality of alerts; estimate an execution frequency for each node of the graphical representation of execution behavior; estimate an execution probability for each node of the graphical representation of execution behavior using the computed one or more possible execution paths; locate respective nodes containing the plurality of alerts on the graphical representation of execution behavior; compute a complexity indicator for each of the plurality of alerts using the estimated execution frequencies and the estimated execution probabilities for the respective nodes containing the plurality of alerts on the graphical representation of execution behavior; determine an importance measure for each of the respective nodes containing the plurality of alerts; count a number of other alerts on each execution path for the plurality of alerts; assign an alert type score to each of the plurality of alerts; and compute the respective alert metrics by combining the estimated execution frequencies, the estimated execution probabilities, the complexity indicators, the importance measures, the count numbers of other alerts, and the alert type scores for the plurality of alerts.

According to an example implementation, for determining the importance measure for each of the respective nodes containing the plurality of alerts, the machine-readable instructions, when executed by the one or more processors, cause the one or more processors to: proceed, starting with a fractional share rank and a null rank and in an iterative or recursive manner, to: equally share an old rank of each of the respective nodes containing the plurality of alerts with every linked node of the respective node, and add a supplemental share rank to every node, for a next iteration until relative ranks among the respective nodes containing the plurality of alerts and the linked nodes are unchanged between iterations; and output normalized ranks for the respective nodes containing the plurality alerts for the importance measure.

According to an example implementation, for assigning the alert type score to each of the plurality of alerts, the machine-readable instructions, when executed by the one or more processors, cause the one or more processors to: determine a security measure, a quality measure, and an accuracy measure related to the one or more static code analysis processes from which the plurality of alerts are obtained; and generate the alert type score by combining the security measure, the quality measure, and the accuracy measure for each of the plurality of alerts.

According to an example implementation, for computing the one or more possible execution paths for each of the plurality of alerts, the machine-readable instructions, when executed by the one or more processors, cause the one or more processors to: generate a backwards slice for each of the plurality of alerts; enumerate the generated slices according to locations of the plurality of alerts and a parameter that identifies at least one node with an influence on a value of the parameter at each of the locations; and output the one or more possible execution paths in an ordered list of one or more nodes for each of the plurality of alerts.

According to an example implementation, the machine-readable instructions, when executed by the one or more processors, cause the one or more processors to further: resolve at least one of the plurality of alerts based on the ranked list; recalibrate at least one of the respective alert metrics for remaining one or more of the plurality of alerts; update the ranked list upon determining that a subset of the ranked list of the plurality of alerts has been resolved; and output, to the user via the user interface, the updated rank list.

According to an example implementation consistent with the present disclosure, a method, comprises: obtaining, from a user via a user interface by a computing apparatus configured by executing machine-readable instructions, an identification of computer code for analysis; retrieving, from a memory storage device by the computing apparatus, the computer code based on the identification obtained from the user; generating, by the computing apparatus, an abstract program representation of the retrieved computer code; conducting, by the computing apparatus, execution behavior analysis of the computer code using the abstract program representation to generate a graphical representation of execution behavior for the computer code; obtaining, by the computing apparatus, a plurality of alerts generated from one or more static code analysis processes that are performed on the computer code; computing, by the computing apparatus, respective alert metrics for the plurality of alerts using the abstract program representation and the graphical representation of execution behavior; ranking, by the computing apparatus, the plurality of alerts by the computed alert metrics; and outputting, to the user via the user interface by the computing apparatus, a ranked list of the plurality of alerts.

According to an example implementation, the method further comprises, for generating the abstract program representation: converting, by the computing apparatus, the retrieved computer code to a stream of source code text; tokenizing, by the computing apparatus, the converted text stream into a plurality of tokens; assigning, by the computing apparatus, respective context indicators to the tokens; and generating, by the computing apparatus, an abstract syntax tree using the tokens with the assigned context indicators, said abstract syntax tree representing the abstract program representation.

According to an example implementation, the method further comprises, for the execution behavior analysis: determining, by the computing apparatus, a control flow of the retrieved computer code using the abstract program representation to generate one or more control flow graphs; identifying, by the computing apparatus, one or more data dependencies among a plurality of nodes in the one or more control flow graphs to generate corresponding one or more program dependence graphs; and generating, by the computing apparatus, a code graph representation of a system associated with the retrieved computer code using the one or more program dependence graphs, said code graph representation being used as the graphical representation of execution behavior to compute the respective alert metrics.

According to an example implementation, the code graph representation is generated using one or more call graphs derived from an abstract syntax tree comprised in the abstract program representation.

According to an example implementation, the method further comprises, for computing the respective alert metrics: computing, by the computing apparatus, one or more possible execution paths for each of the plurality of alerts; estimating, by the computing apparatus, an execution frequency for each node of the graphical representation of execution behavior; estimating, by the computing apparatus, an execution probability for each node of the graphical representation of execution behavior using the computed one or more possible execution paths; locating, by the computing apparatus, respective nodes containing the plurality of alerts on the graphical representation of execution behavior; computing, by the computing apparatus, a complexity indicator for each of the plurality of alerts using the estimated execution frequencies and the estimated execution probabilities for the respective nodes containing the plurality of alerts on the graphical representation of execution behavior; determining, by the computing apparatus, an importance measure for each of the respective nodes containing the plurality of alerts; counting, by the computing apparatus, a number of other alerts on each execution path for the plurality of alerts; assigning, by the computing apparatus, an alert type score to each of the plurality of alerts; and computing, by the computing apparatus, the respective alert metrics by combining the estimated execution frequencies, the estimated execution probabilities, the complexity indicators, the importance measures, the count numbers of other alerts, and the alert type scores for the plurality of alerts.

According to an example implementation, the method further comprises, for determining the importance measure for each of the respective nodes containing the plurality of alerts: proceeding, by the computing apparatus, starting with a fractional share rank and a null rank and in an iterative or recursive manner, to: equally share an old rank of each of the respective nodes containing the plurality of alerts with every linked node of the respective node, and add a supplemental share rank to every node, for a next iteration until relative ranks among the respective nodes containing the plurality of alerts and the linked nodes are unchanged between iterations; and outputting, by the computing apparatus, normalized ranks for the respective nodes containing the plurality alerts for the importance measure.

According to an example implementation, the method further comprises, for assigning the alert type score to each of the plurality of alerts: determining, by the computing apparatus, a security measure, a quality measure, and an accuracy measure related to the one or more static code analysis processes from which the plurality of alerts are obtained; and generating, by the computing apparatus, the alert type score by combining the security measure, the quality measure, and the accuracy measure for each of the plurality of alerts.

According to an example implementation, the method further comprises, for computing the one or more possible execution paths for each of the plurality of alerts, generating, by the computing apparatus, a backwards slice for each of the plurality of alerts; enumerating, by the computing apparatus, the generated slices according to locations of the plurality of alerts and a parameter that identifies at least one node with an influence on a value of the parameter at each of the locations; and outputting, by the computing apparatus, the one or more possible execution paths in an ordered list of one or more nodes for each of the plurality of alerts.

According to an example implementation, the method further comprises: resolving, by the computing apparatus, at least one of the plurality of alerts based on the ranked list; recalibrating, by the computing apparatus, at least one of the respective alert metrics for remaining one or more of the plurality of alerts; updating, by the computing apparatus, the ranked list upon determining that a subset of the ranked list of the plurality of alerts has been resolved; and outputting, to the user via the user interface by the computing apparatus, the updated rank list.

BRIEF DESCRIPTION OF THE DRAWING FIGURES

Various example implementations of this disclosure will be described in detail, with reference to the following figures, wherein.

Figure 15C:
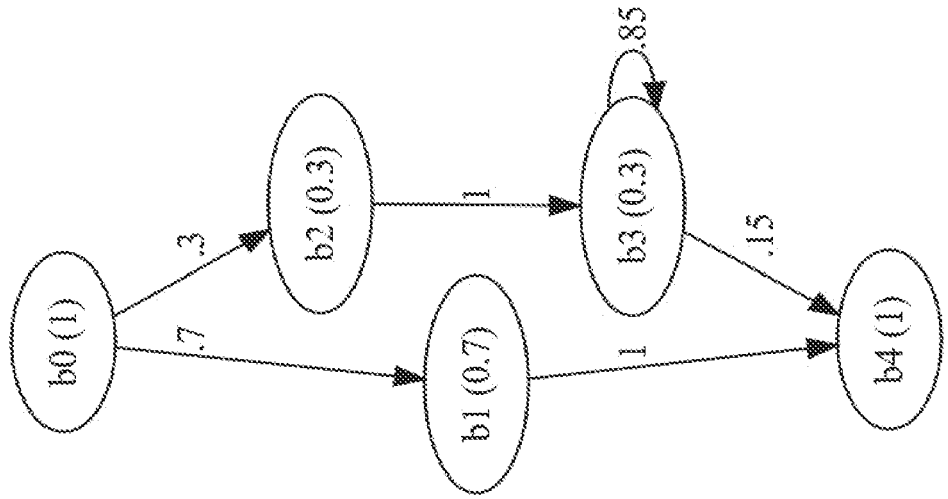
Figure 15B:
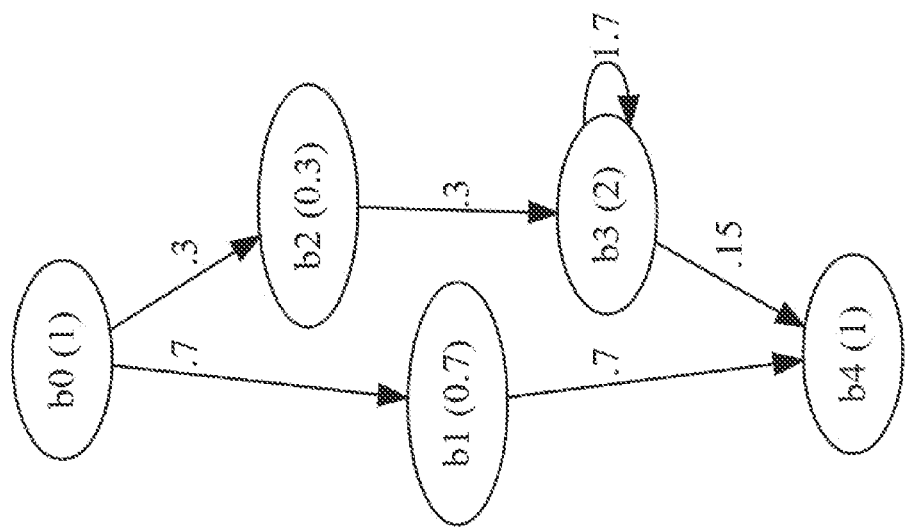
Figure 15A:
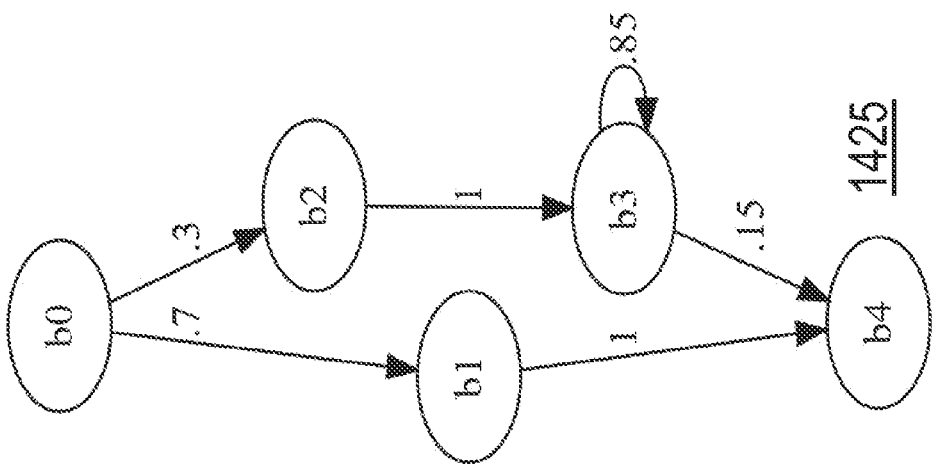

FIGS. 15A, 15B, and 15C are illustrations of branch probabilities, EEFs, and node and edge probability estimates, respectively, that are computed for an example PDG.

DETAILED DESCRIPTION OF CERTAIN EMBODIMENTS OF THE DISCLOSURE

The present disclosure provides an alert ranking and prioritization method that employs Control flow graphs (CFGs) and System Dependence Graphs (SDGs) extracted from the code through static analysis to compute relevant metrics of the alert code and rank them for analysis. The ranking and prioritization would reorder the static analysis results to maximize certain objectives, such as focusing on critical components, or most executed components—ultimately, to aid developers to focus on the most important alert relative to other alerts identified by the static analysis. The motivation and insight behind the present disclosure is that not all alerts, even of the same type, are equally important and, therefore, developers can prioritize their inspection on more important ones over less-likely ones by reviewing more actionable alerts earlier in the review process.

The technique uses static analysis meta data to build CFGs, PDGs (Program Dependence Graphs) and SDGs of the code with the alerts. These are then used to provide additional context to the alerts. Specifically, specific metrics related alert-code are derived to capture the code execution behavior, importance, and/or predetermined criteria by users. This information can then be combined to give a total score for the alerts and rank them by their importance relative to other alerts.

Figure 1:
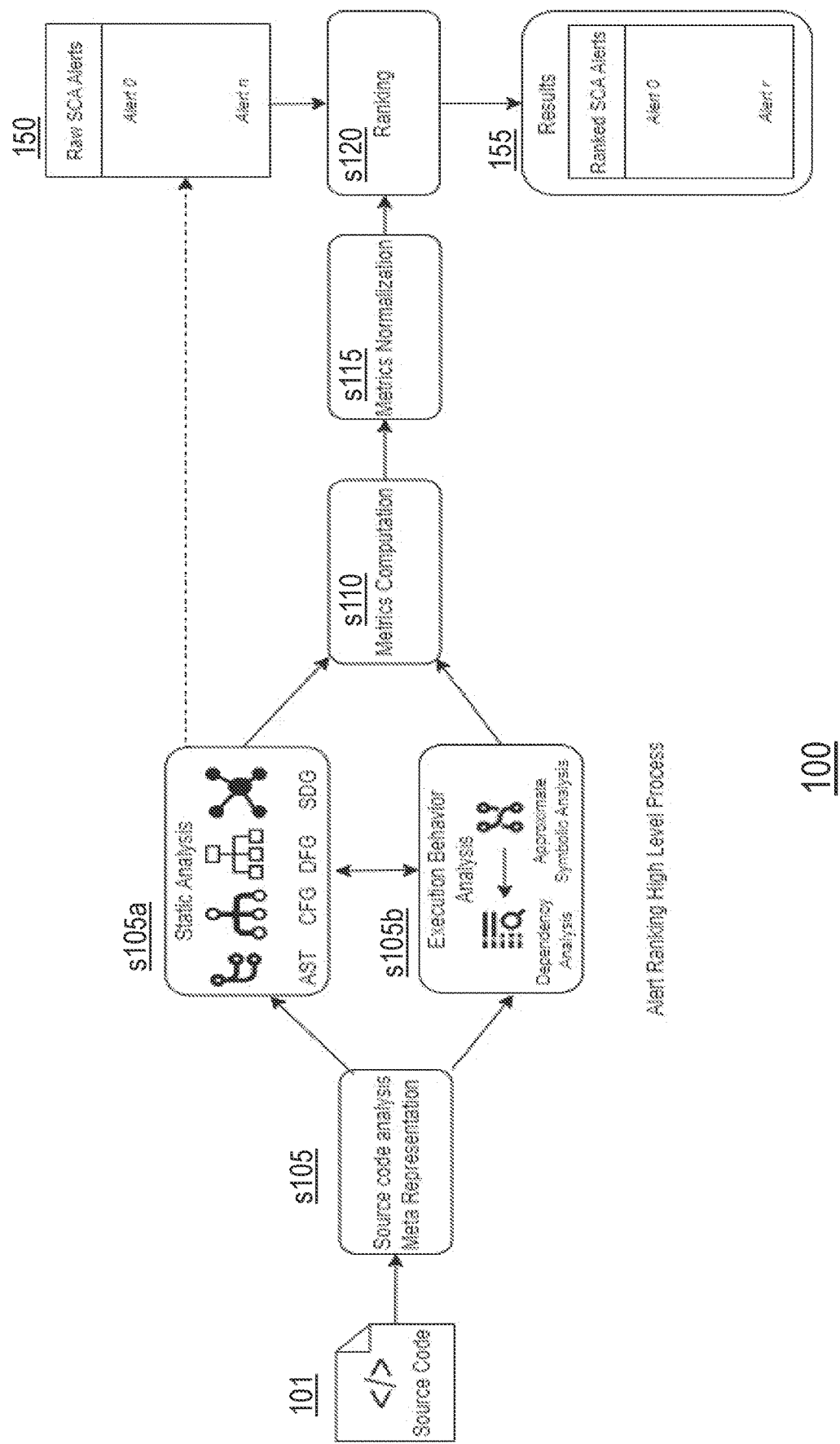
FIG. 1 is a flow diagram for illustrating a code analysis and alert ranking process for scanning software code, evaluating alert items, and prioritizing the evaluated alert items in accordance with an example implementation of the present disclosure.

FIG. 1 is a flow diagram for illustrating a code analysis and alert ranking process 100 for scanning software code, evaluating alert items, and prioritizing the evaluated alert items in accordance with an example implementation of the present disclosure.

As shown in FIG. 1, process 100 initiates with step s105 of obtaining source code 101 of one or more programs and analyzing the obtained source code 101 to produce a meta representation. According to one embodiment, an operator identifies source code 101 to be analyzed via a user interface (e.g., user interface 1020 shown in FIG. 10). A source code transformation is performed to obtain the meta representation. As an example, one or more of an Abstract Syntax Tree (AST), a Control Flow Graph (CFG), a Data Flow Graph (DFG), a Program Dependence Graph (PDG) (not shown), and a System Dependence Graph (SDG) for the evaluated source code is produced at step s105*a*. As shown in FIG. 1, the meta representation is used for conducting execution behavior analysis on the corresponding code (step s105*b*). As an example, one or more of an approximate symbolic analysis and a dependency analysis is conducted at step s105*b* for the execution behavior analysis. It should be understood that other types of meta representations can be produced at step s105*a* and other types of code analyses can be conducted at step s105*b* without departing from the spirit and scope of the present disclosure.

As illustrated in FIG. 1, according to one implementation, static analysis (e.g., SCA) on the source code 101 corresponding to the meta representation is also conducted at step s105*a* to obtain one or more raw alerts 150—e.g., Raw SCA Alerts (Alert 0, . . . . Alert n, where n is an integer>0).

Next, at step s110, alert metrics are computed using the meta representation produced at step s105*a* and the outcome of the execution behavior analysis at step s105*b*. The computed metrics are normalize, at step s115, and the normalized metrics are used to rank the raw alerts 150, at step s120, to produce a ranked list of alerts 155—e.g., Ranked SCA Alerts (Alert 0, . . . . Alert r, where r is an integer>0). It is noted that, according to one example implementation, the numeral suffixes are reassigned from raw SCA alerts 150 to ranked SCA alerts 155 to reorder the alerts.

Thus, source code is scanned for static analysis and the results are normalized to produce a ranked list of alerts with type and location.

Code to Graph Meta Representation

As described above with reference to FIG. 1, the source code 101 needs to be transformed to obtain intermediate representations (or necessary source code constructs) that can be used to estimate program behavior and to enable the computation of related metrics. According to one implementation of the present disclosure, System Dependence Graphs (SDGs) are used as such intermediate representations. SDG is a generalization of the Program Dependence Graphs that captures data and control dependencies for the whole code under analysis. The SDG is a directed graph capturing control and data dependence in the system. Accordingly, the SDG can be used to find all possible execution paths that are relevant to an alert. These execution paths are then used to extract necessary information for calculation of the ranks of specific alerts.

Figure 2:
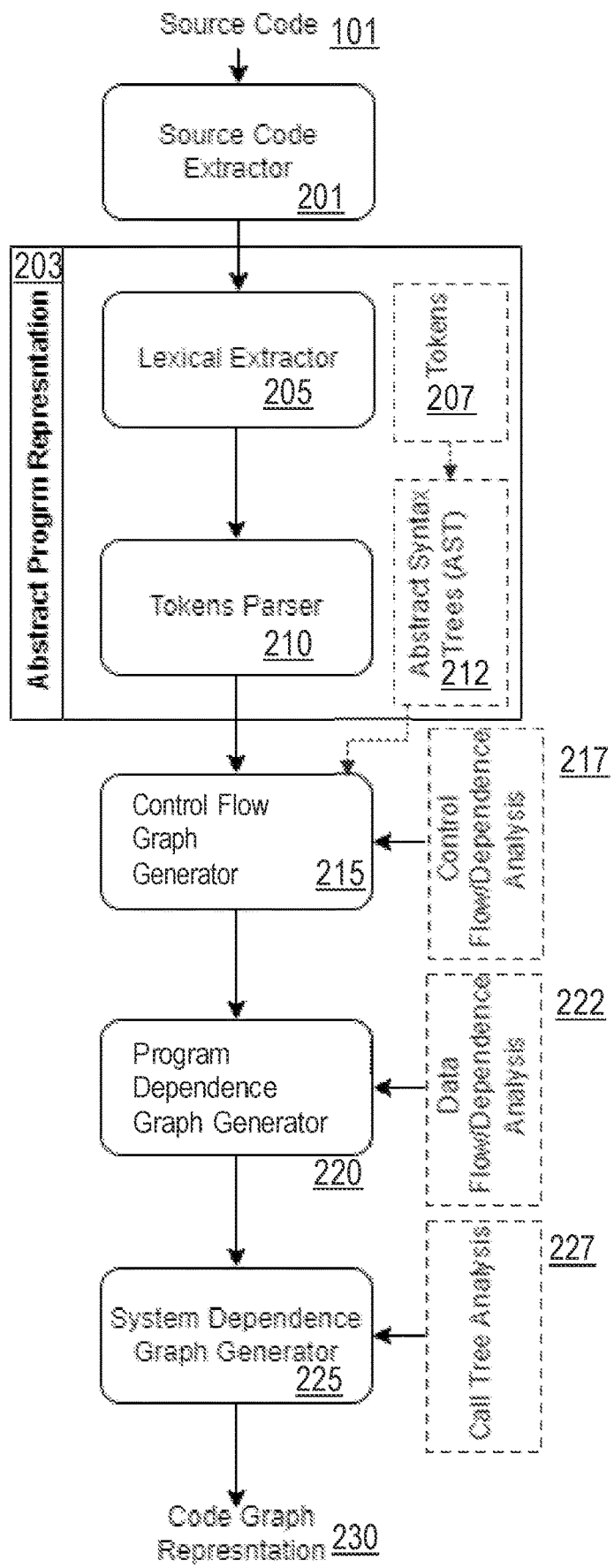
FIG. 2 is a schematic diagram of the components of a code graph representation generator adapted to perform a meta representation generating step of the process shown in FIG. 1 according to one example implementation of the present disclosure.

FIG. 2 is a schematic diagram of the components of a code graph representation generator 200 adapted to perform the meta representation generating step s105 of process 100 according to one example implementation of the present disclosure. The components of generator 200 illustrated in FIG. 2 can be implemented using one or more software components, one or more hardware components, and/or a combination thereof. According to an example embodiment, the meta representation is generated based on the principle that a set of statements in source code (e.g., 101) executed in the same control scope are structured as a block. The block is then represented as a node in a graph with edges to depict a control sequence between different nodes in the graph.

Figure 9:
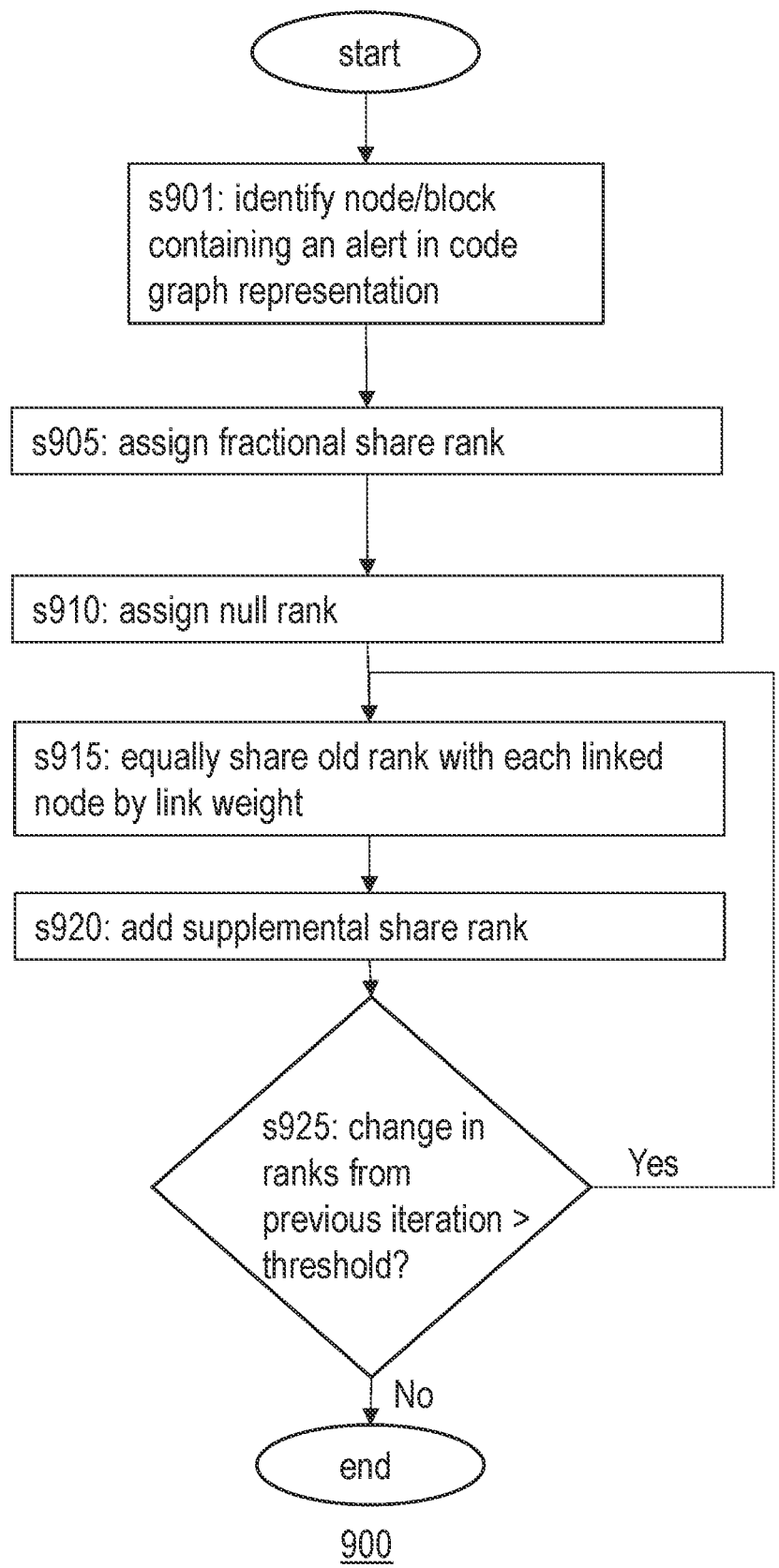
FIG. 9 is a flow diagram illustrating an alert node ranking process according to one implementation of present disclosure.

As shown in FIG. 2, a source code extractor 201 obtains source code 101 that is being analyzed, which can be obtained from a storage device (e.g., memory 915, memory 975, and/or information system 980 illustrated in FIG. 9), such as a source code repository. The source code extractor 201 converts the obtained code 101 from its compressed representation to a plain source code. Once the source code 101 is extracted, an abstract representation 203 of the code is obtained using a lexical extractor 205 and a tokens parser 210, as shown in FIG. 2.

Lexical extractor ("lexer") 205 tokenizes the extracted source code using simple grammar that describes these tokens. According to one implementation, the tokenizing comprises:
   a. a tokenizer (not shown) breaks a stream of text into tokens 207—for example, by looking for whitespace (tabs, spaces, new lines); and
   b. lexer 205 then attaches additional context to the tokens 207—for example, tokens 207 can indicate a number, a string literal, an equality operator, and the like, using language specific grammar.

Tokens parser 210 then generates an abstract syntax tree (AST) 212 from the lexical tokens 207. In accordance with one embodiment of the present disclosure, AST 212 can be referred to as an abstract program representation (203) or a code meta representation.

The AST 212 is used by a control flow graph (CFG) generator 215, which conducts control flow/dependence analysis 217 on AST 212 to generate a control flow graph (CFG) (see FIGS. 10 and 11)—for example, by exploring different execution paths in the code. According to one implementation, the control flow graph generating comprises:
   a. divide the intermediate code of the extracted source code by extractor 201 into basic blocks ($b_n$) (n being an integer>0) (not shown). According to one implementation, each basic block ($b_n$) comprises a piece of straight-line code without jumps (e.g., loops or conditional statements) in or out of a middle portion of the block ($b_n$). Below is a list of example criteria for identifying the basic blocks ($b_n$):
      i. determine a set of block leaders (L) (i.e., first line of basic block ($b_n$));
      ii. the first line is a leader;
      iii. any line is a leader if there is a tuple IF . . . goto $b_n$, goto $b_n$ e.g., loops;
      iv. a line immediately following IF . . . goto $b_n$ or goto $b_n$ is a leader; and
      v. a basic block $b_n$ consists of a leader and all of the following statements until a next leader; and
   b. the basic blocks ($b_n$) within one program are organized as a (control) flow graph (or CFG). A flow-graph comprises basic blocks $b_1$, . . . $b_n$ (n>0) as nodes and directed edges between nodes (e.g., $b_1$->$b_2$) if control can flow from the nodes in question (e.g., $b_1$ to $b_2$). More specifically,
      i. for unconditional jumps, directed edges are constructed from jump instructions from a current node to its direct successor; and
      ii. for conditional jumps, two directed edges are specified:
         1. one from a current node to its direct successor, and
         2. another from the current node to a destination node according to the program control flow (e.g., condition).

Next, a Program Dependence Graph (PDG) Generator 220 performs data flow/dependence analysis 222 on the CFG from CFG generator 215 to generate a PDG (not shown)—for example, by adding data flow/dependence to the CFG. In one implementation, the CFG blocks are retained as nodes in the PDG and data dependence is added as follows:
   a. control dependence is provided for a node $b_n$ and one of it's post-dominators $b_{n+1}$; and
   b. every node is traversed in the CFG to link any two nodes in the CFG if there is data dependence—for example, a node $b_n$ is dependent on a node $b_{n+k}$ if there is a variable defined in $b_{n+k}$ and used in $b_n$ and there is a path p that connect $b_{n+k}$ to $b_n$.

In this manner, one or more PDGs are generated by PDG Generator 220. The generated PDGs are linked together by inter-procedural control dependence edges (e.g., method/function calls or parameter passing) by a System Dependence Graph (SDG) Generator 225 to generate a SDG that is a code graph representation 230 of source code 101, as illustrated in FIG. 2. In one implementation, a call tree analysis 227 is conducted on the PDGs and a call edge is created for each possible call among PDG nodes (e.g., methods/procedures/functions) to generate code graph representation 230.

Figure 3:
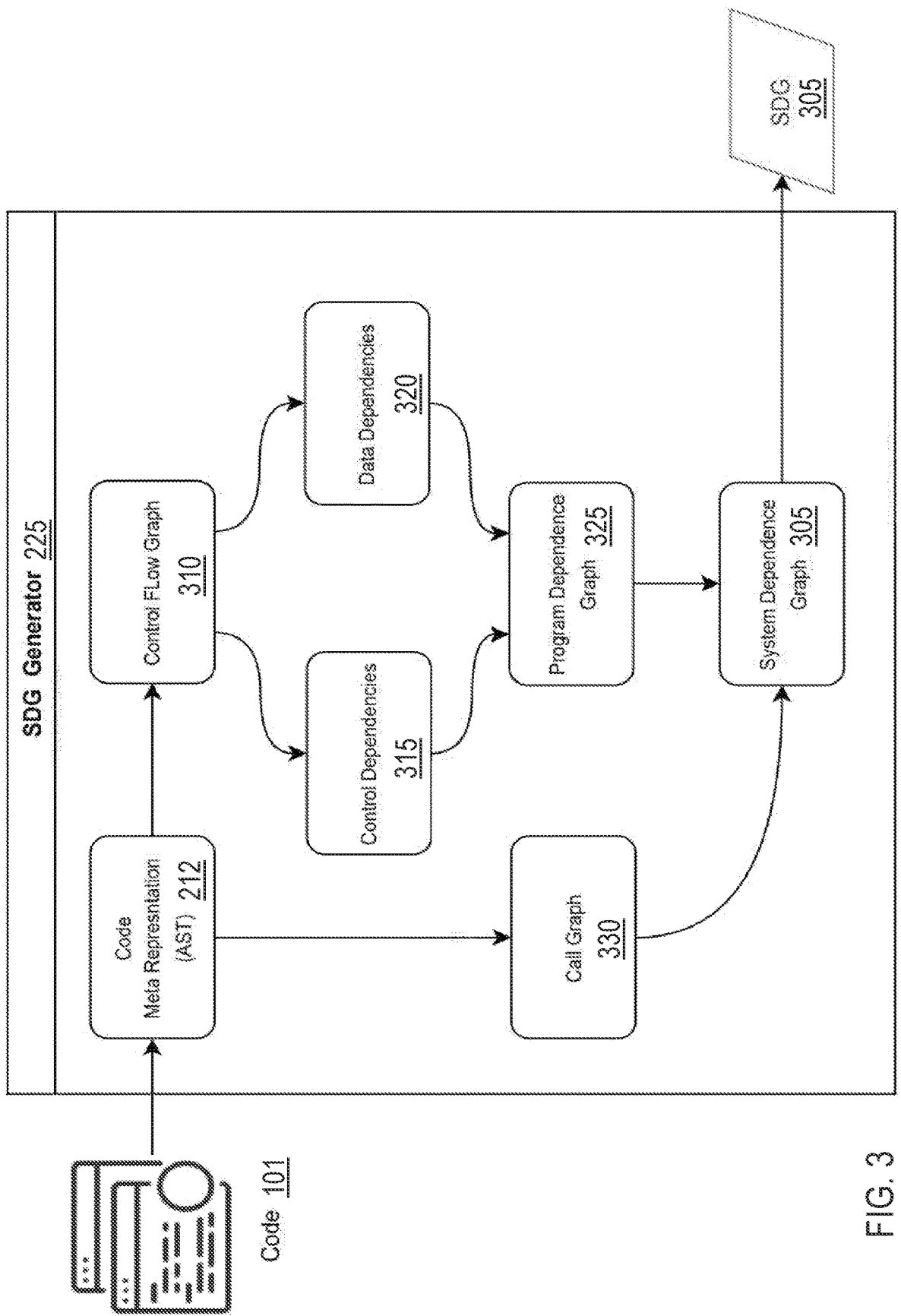
FIG. 3 is schematic diagram illustrating an intermediate representation flow for an output of a system dependence graph (SDG) generator according to one example implementation of the present disclosure.

FIG. 3 is schematic diagram illustrating the intermediate representation flow for the output of SDG generator 225 according to one example implementation of the present disclosure. As illustrated in FIG. 3, SDG generator 225 can be logically defined to include elements 201, 203, 205, 210, 215, and 220 described above to obtain source code 101, generate the intermediate representations by these elements, and output one or more SDG(s) 305 that embody code graph representation 230 shown in FIG. 2. After parsing the program (code 101), an abstract tree (AST) (or code meta representation) 212 is generated.

As described above with reference to FIG. 2, each node ($b_n$) in AST 212 corresponds to an abstract component (e.g., a function declaration, an operator) in the program. According to one embodiment, a tree node ($b_n$) is represented by a tuple where a first component represents the type or name of the node followed by zero or more components each representing a child (e.g., $b_{n+1}$ . . . ) of the current node ($b_n$).

In correspondence with the description of elements 203, 205, 207, and 210 with reference to FIG. 2 above, the AST 212 is obtained by:
   a. defining a root element,
   b. assigning statements as one or more child nodes, and
   c. adding variables and values to the one or more child nodes.

AST 212 is then used to generate the control flow graph 310 (e.g., by CFG Generator 215 described above with reference to FIG. 2), by identifying a blocks execution path.

In correspondence with the description of element 215 and 217 with reference to FIG. 2 above, the control flow is obtained by:
   a. identifying basic blocks (e.g., no branches or -conditions-), and
   b. every node except the first has only one path in and one path out.

The resulting control flow (or control dependencies 315) can then be used to infer the data flow diagram (or data dependencies 320) by adding paths (e.g., edges) to show variables and conditional branches. Using this information, the data analysis is performed by tracking data variables that are changed based on control to another node, resulting in program dependence graph 325. Finally, using the information in the data flow graph (or program dependence graph 325) and one or more call graphs (330) that are derived from AST 212, one or more application dependence graphs (or system dependence graph 305) are generated. The application dependence graph(s) (or system dependence graph 305) show inter and intra dependencies of different components in an overall system associated with or defined by source code 101.

Figure 4:
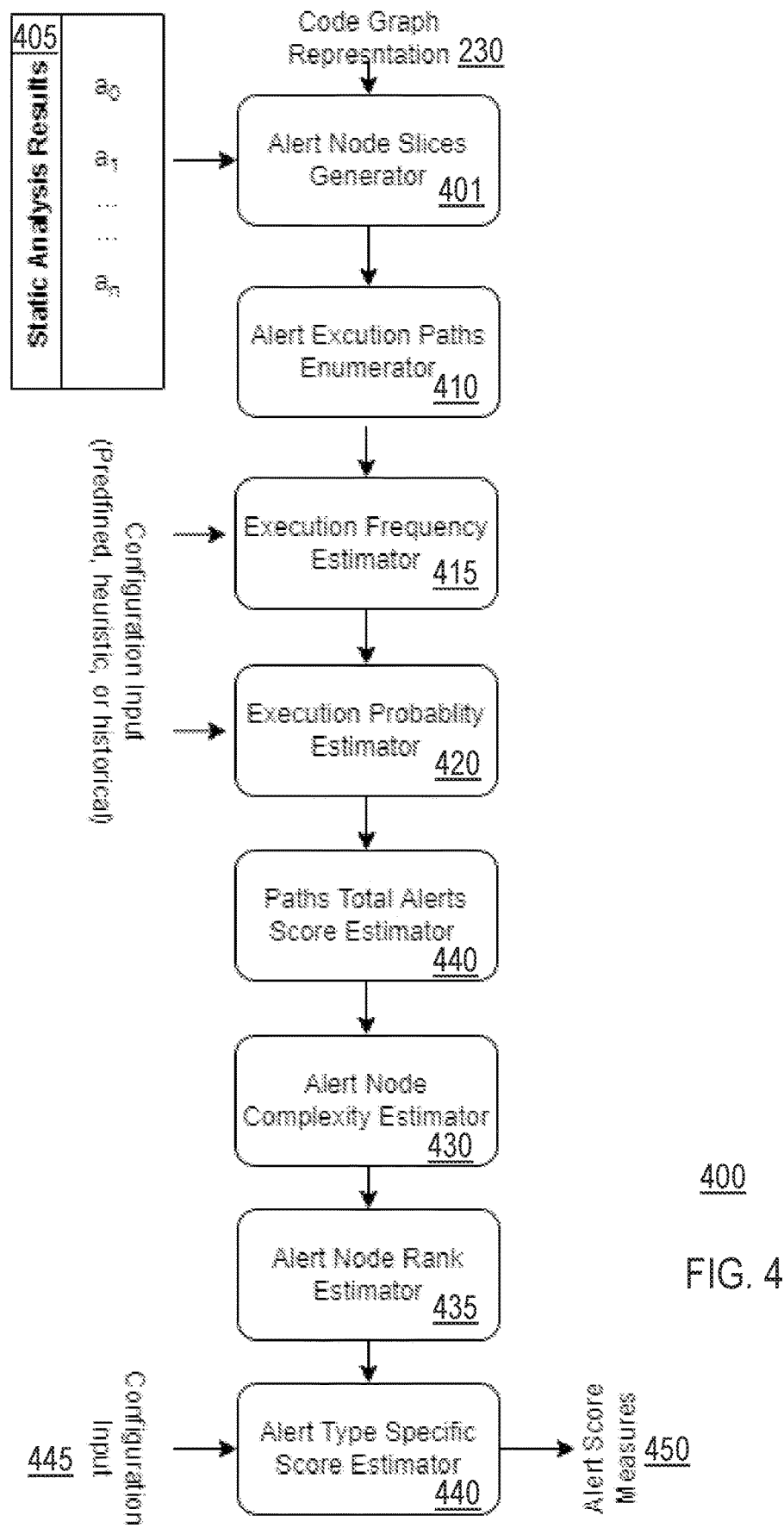
FIG. 4 is a schematic diagram of the components of an alert metric generator adapted to generate alert prioritization metrics using a code graph representation for ranking alerts in correspondence with the process shown in FIG. 1 according to one example implementation of the present disclosure.

After obtaining the code graph representation 230 (or SDG 305), it is used to generate the necessary metrics by an alert metric generator 400, as illustrated in FIG. 4, for ranking and prioritizing code alerts.

FIG. 4 is a schematic diagram of the components of an alert metric generator 400 adapted to generate alert prioritization metrics using code graph representation 230 for ranking SCA alerts (150) in correspondence with steps s110, s115 and s120 of process 100 according to one example implementation of the present disclosure. The components of alert metric generator 400 illustrated in FIG. 4 can be implemented using one or more software components, one or more hardware components, and/or a combination thereof. It is noted that, as described below, elements 430, 435 and 440 conduct computations based on results from elements 415 and 420. Thus, the arrangement of these elements shown in FIG. 4 are for illustrative purposes only and their respective order relative to one another is interchangeable without departing from the spirit and scope of the present disclosure.

As illustrated in FIG. 4, alert metric generator 400 comprises an alert node slices generator 401 that annotates (e.g., tags or labels) code graph representation 230 (or SDG 305) with static analysis results 405 of at least a portion of source code 101, which can include, for example, one or more alerts $a_0 \ldots a_n$ (n>0). In one example implementation, the static analysis results 405 are obtained using one or more SCA tools (not shown) on at least a portion of source code 101 and the one or more alerts (e.g., $a_0 \ldots a_n$) are located by alert node slices generator 401 according to code graph representation 230. The notation results are forwarded to an alert execution paths enumerator 410 for analysis. In another example, one or more portions of the annotated code graph representation comprising the alert(s) (e.g., $a_0 \ldots a_n$) are forwarded to the alert execution paths enumerator 410 for analysis.

Figure 5:
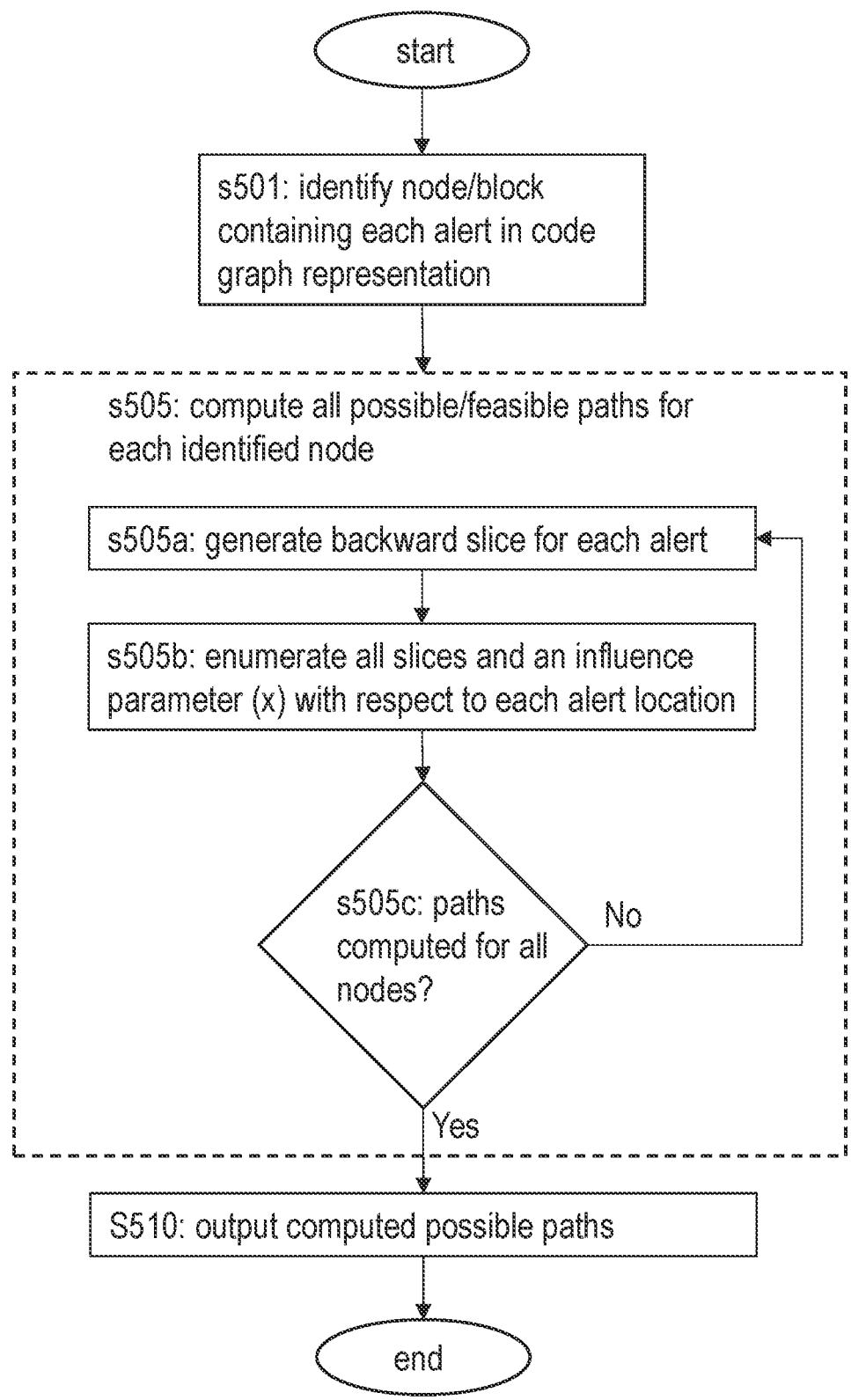
FIG. 5 is a flow diagram illustrating a path enumeration process according to one implementation of the present disclosure.

According to one example implementation of the present disclosure, the alert execution paths enumerator 410 enumerates execution paths related to an alert under consideration. FIG. 5 is a flow diagram illustrating a path enumeration process 500 according to one implementation of the present disclosure, which comprises:

step s501: based on the alert meta-data (file name and line number), identify each node/block ($b_1 \ldots b_N$) in the SDG 305 (or annotated code graph representation) that contain an alert ($b_n$);

step s505: compute all possible/feasible paths P for each identified node (e.g., alert code statement node) by:

step s505a: generating a backwards slice for each alert (e.g., $a_0 \ldots a_n$) by determining which SDG nodes could have affected the outcome of the alert node ($b_n$);

step s505b: enumerating all slices of the SDG (or annotated code graph representation) with respect to alert location ($b_n$) and a parameter x that identifies the set of nodes that may influence the value of variable x at the alert node ($b_n$);

step s505c: recursively computing the possible paths for all identified nodes. In one example implementation, step s505 is repeated if the possible paths have not been computed for all nodes in the SDG (305) (or annotated code graph representation) ("No") and process 500 proceeds to step s510 if all possible paths have been computed for all nodes in the SDG (305) (or annotated code graph representation) ("Yes"); and step s510: output the list of slices including all possible paths of each identified alert node ($b_n$) as an ordered list of nodes ($b_0, \ldots, b_n, \ldots b_N$).

Figure 6:
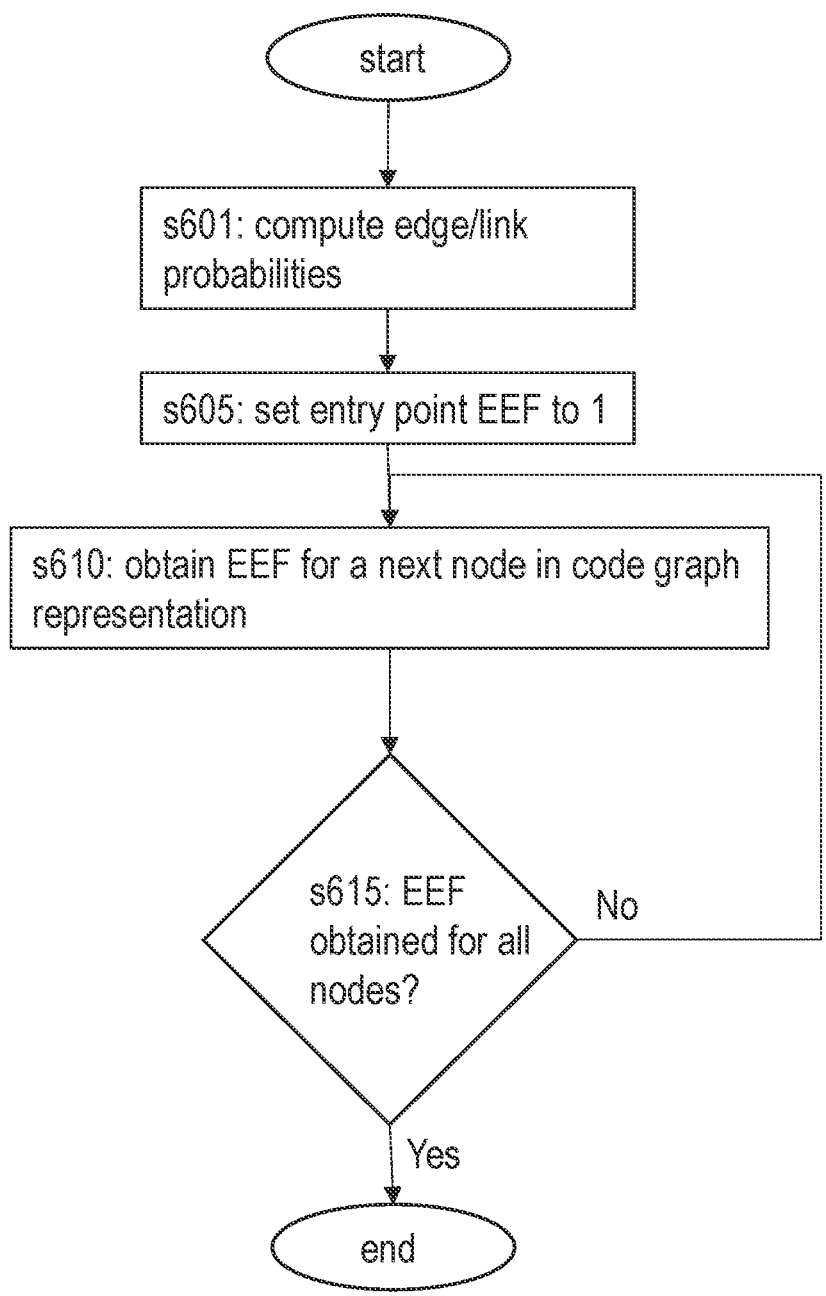
FIG. 6 is a flow diagram illustrating an estimated execution frequency (EEF) computation process according to one implementation of the present disclosure.

Next, an estimated execution frequency (EEF) is obtained for each SDG (305) (or annotated code graph representation) node (b) by an execution frequency estimator 415. FIG. 6 is a flow diagram illustrating an EEF computation process 600 according to one implementation of the present disclosure, which comprises:

step s601: compute edge/link probabilities for the edges/links comprised in the annotated code graph representation (230) (or SDG 305). In one embodiment, a uniform distribution is used to assign the probability 1/n in the case of a branch (e.g., if and case statements) while loop statements are computed as n−1/n. In alternative implementations, known heuristic or user defined values can also be used to estimate branching probabilities.

step s605: set the entry point EEF to 1;

step s610: obtain the EEF for any node ($b_n$) (e.g., a next node) in the SDG (305) (annotated code graph representation) by computing the sum of its predecessor frequency multiplied by their branching probability computed earlier. In one implementation, the EEF is calculated using equation (1) below:

$$EEF(b_n) = \sum\nolimits_{all\ predecessor\ b_{Pred} of\ b_n} EEF(b_{Pred}) * Prob(b_{Pred}), \quad (1)$$

where $b_{Pred}$=predecessor node(s) of $b_n$; and step s615: recursively compute the term to propagate the EEF for all nodes. In one example implementation, step s610 is repeated if the EEF has not been obtained for all nodes in the SDG (305) ("No") and process 600 is terminated if the EEF has been obtained for all nodes in the SDG (305) ("Yes").

According to one implementation, for the purpose of ranking, this EEF value is normalized using equation (2) as follows:

$$EEF(b\_n)^N = \frac{1}{\partial}\ln(1 + EEF(b_n)), \quad (2)$$

where is $\partial$ is a predefined scaling factor.

Generally, a higher EEF for a node means that the portion of the application code represented by the node is more frequently visited during a single execution. However, the application may have a very low probability of reaching this node/code compared to other nodes.

Thus, with reference back to FIG. 4, an execution probability estimator 420 computes a probability (Prb($b_n$)) to capture the difference between blocks that are always guaranteed to be executed compared to blocks that may execute any number of times during a single program run.

Figure 7:
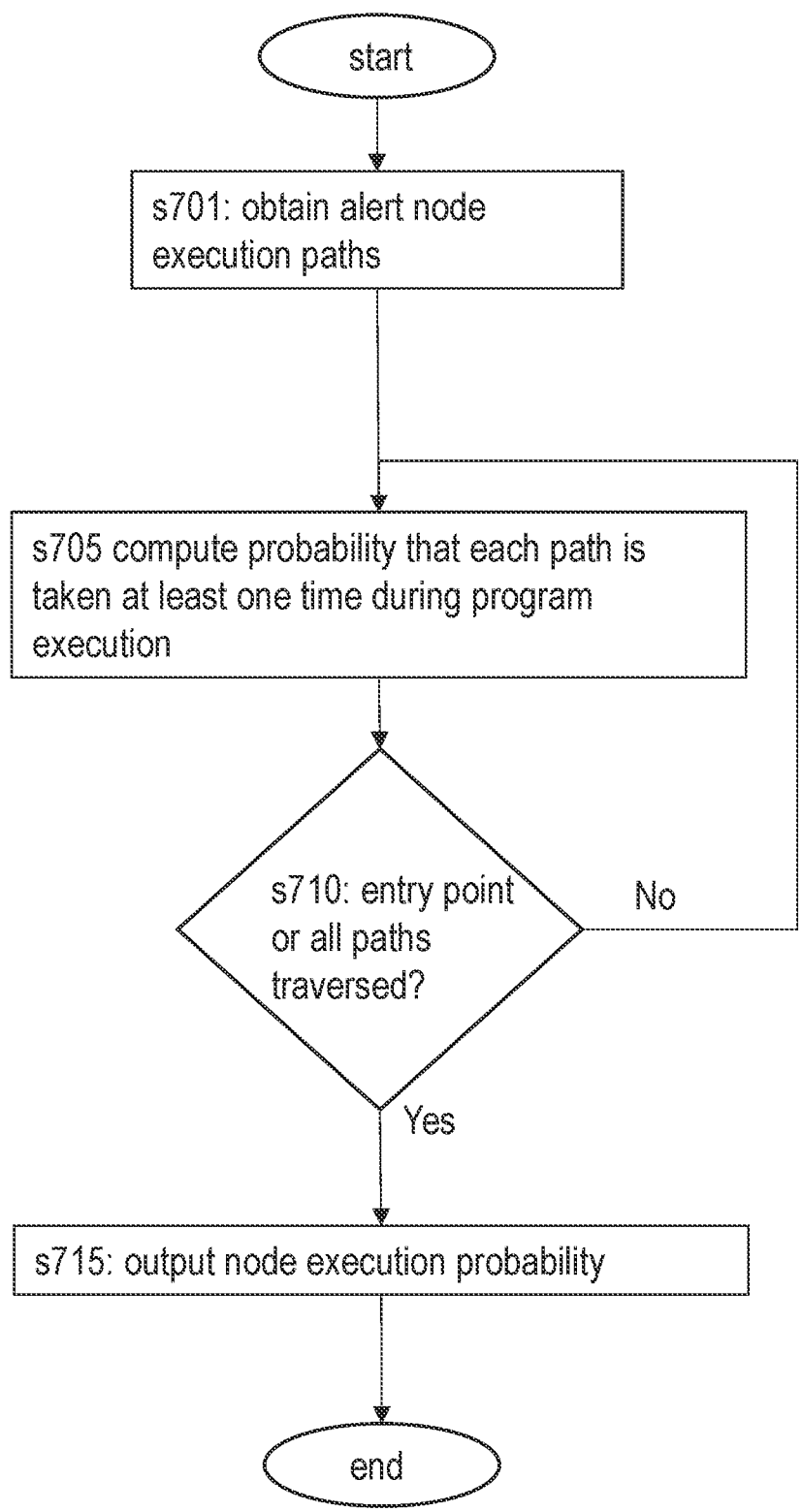
FIG. 7 is a flow diagram illustrating a probability estimation process according to one implementation of the present disclosure.

In accordance with one example implementation, the probability Prb($b_n$) is estimated only for each node with an alert (e.g., $a_0 \ldots a_n$). FIG. 7 is a flow diagram illustrating a probability estimation process 700 according to one implementation of the present disclosure to compute the probability that a node ($b_n$) containing an alert ($a_n$) is actually visited during an execution:

step s701: obtain all possible paths P for each alert node ($b_n$)—for example, as determined by alert execution paths enumerator 410 in accordance with process 500;

step s705: for every path $p_k$ in the list of paths P, the probability that the path $p_k$ is taken at least one time is computed recursively as follows:

i. traverse the path from the SDG (or annotated code graph representation) entry point to the alert node $b_n$, the Prb($b_n$) is 1 if the entry point is the $b_n$ and the recursion is ended—in one implementation, a determination is made, at step s710, whether the node/block ($b_n$) is an entry point or whether all paths have been traversed, if neither is true ("No") then step s705 is repeated for a next path but if either is true ("Yes") then the recursion is ended;

ii. for every child from the entry point, compute the probability of visiting that child (control transfer to the child node):
1. if there is one child (or successor), the probability is the same as its predecessor;
2. if there are more than one successor—for example, if, case, or switch statement—combine previous node probabilities and divide by the number of siblings based on branch prediction heuristics; and
3. add to the result set; and step s715: the above returns a specific node execution probability Prb($b_n$), which is outputted upon completion of process 700.

It is noted that the above-described node traversals are combinatorial, which can lead to path explosions and that are computationally expensive for large code bases. In embodiments, the computations can be guided with boundaries using available symbolic execution and data flow analysis information. For example, a chopping criterion can be developed to identify a relevant set of nodes that are part of an influence of a source node to a target node—e.g., nodes on a path from "s" to "t" in the PDG (325). Additionally, for the purpose of relative ordering of the alerts, profiling heuristics can be used to speed the computation instead of seeking precise estimated values (e.g., of EFF and Prb).

The EEF($B_a$) and the Prb($B_a$) for a node containing an alert ($B_a$), as obtained based on computations described above, are synthesized to provide an intuition score to alert metric generator 400 based on the likelihood that the alert would be executed and cause an actual defect.

Figure 8:
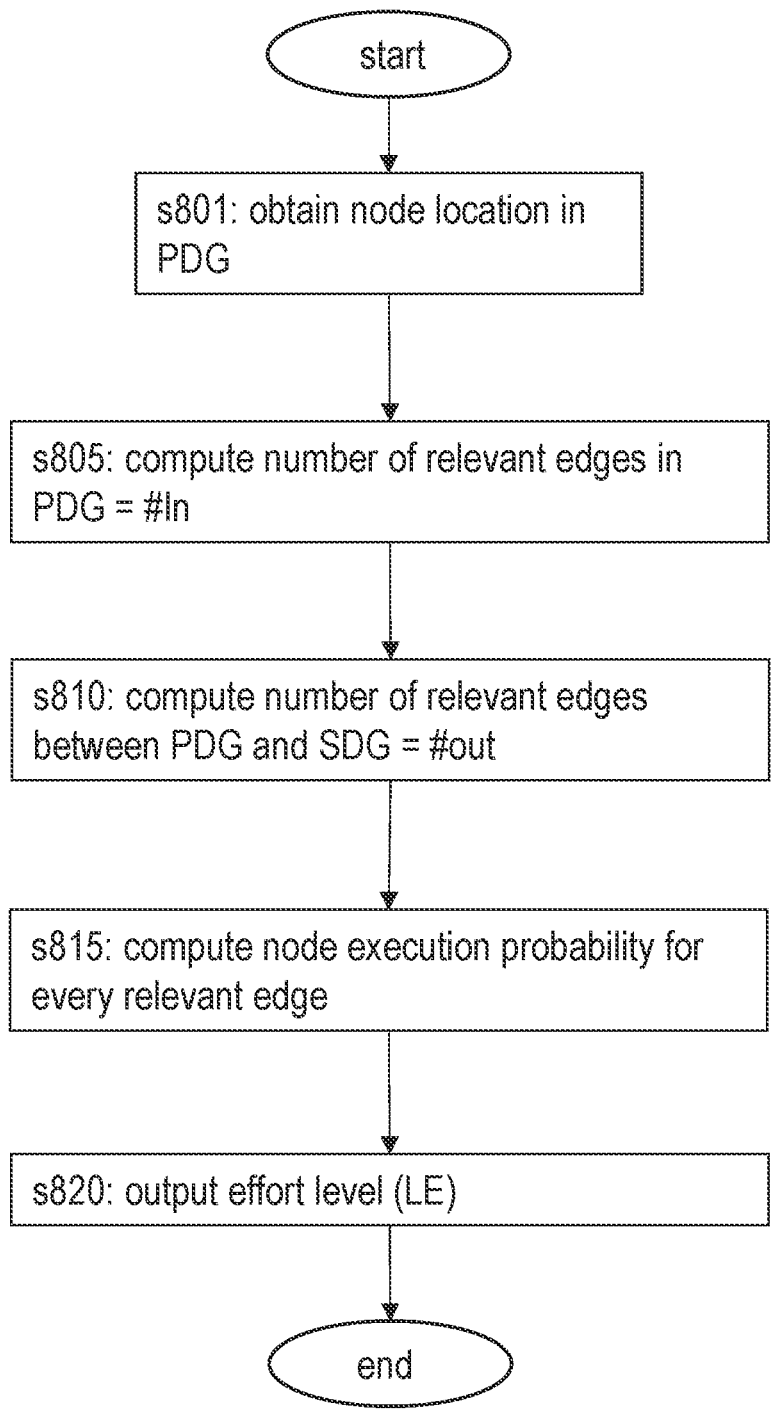
FIG. 8 is a flow diagram illustrating an effort level (LE) determination process according to one example implementation of the present disclosure.

However, such an estimated score still lacks information on an actual level of effort (LE) required for an analyst to review and address the alert. Accordingly, a measure to indicate how comprehensible the code related to an alert is determined by an alert node complexity estimator 430. FIG. 8 is a flow diagram illustrating an effort level (LE) (or complexity indicator) determination process 800 according to one example implementation, which comprises:

step s801: obtain the PDG (325) node where the alert is located;

step s805: compute the number of relevant edges (data flow control) in the respective PDG (325) as #In;

step s810: compute the number of relevant edges between the PDG (325) and SDG (305) as #out;

step s815: compute, for every edge, the estimated frequency (Prb($b_n$)) computed earlier (e.g., process 600); and step s820: output effort (LE) according to equation (3) below:

$$LE = \sum \frac{\#In \times Prb}{\#out \times Prb}. \quad (3)$$

The LE parameter, in essence, results from counting the number of dependencies of an alert node in a PDG (325) to nodes in other PDGs (e.g., comprised in SDG 305) versus the number of dependencies of the alert node to other nodes in the same PDG (325). The result of this count measures how coupled the alert is to other parts of a program comprising the alert compared to other parts of the overall application or system. The more contained the alert is within a program, the easier for the alert to be reviewed. In other words, the LE parameter quantifies an ease of review for an alert in accordance with one implementation of the present disclosure. In embodiments, other measures can also be used to measure the ease or difficulty of an alert review (or a complexity of an alert).

For the purpose of subsequently ranking multiple alerts, the LE measures for the nodes containing alerts ($B_a$) are normalized according to equation (4) below in accordance with one implementation of the present disclosure:

$$LE^N = 1/\sigma \ln(LE(Ba_n)), \quad (4)$$

where $\sigma$ is a scaling factor selected based on the maximum LE value in all of the alerts.

Returning to FIG. 4 and according to one embodiment, an alert node rank estimator 435 determines an importance measure of an alert location—for example, how critical or important the code containing the alert is. The nodes in the SDG (305) are ranked by iteratively computing a centrality measure NR($B_a$) for each node in the SDG (305). FIG. 9 is a flow diagram illustrating an alert node ranking process 900 according to one implementation of present disclosure, which comprises:

step s901: identify the node with the alert $B_a$ in the SDG (305);

step s905: assign each node a fractional share rank, e.g., of 1/N, where N is the total number of nodes;

step s910: assign every node a null rank of 0.0;

step s915: equally share the old rank of each node with every node it links to by a link weight: loop through each vertex (each node) and increase the new rank for every adjacent vertex (neighbor node) by the amount defined by equation (5) below:

rank increase amount = $c \times$ (old node rank/number of unique links),  (5)

where c is a constant used to damp down nodes from having too much influence in the SDG and (1−c) is then used to compensate (normalize) for this in the calculation in the next step; and step s920: add supplemental share rank (e.g., (1−c)/N) to the new page rank of every node.

Constant c (typically set to values between 0.35-0.85) is used to prevent the calculation from being stuck at certain part of the graphs due to nodes with high number links or node sinks. According to one implementation, the alert node rank estimator 435 iterates the above steps s915 and s920 until the node ranks converge when error rate is below a given threshold (e.g., there are no significant changes after each iteration). In one embodiment, the threshold is approximated with the difference between the rank computed at two successive iterations. For example, at step s925, a determination is made whether changes to node ranks are above a predetermined threshold (e.g., 0.035) from a previously iteration. If the changes are above threshold ("Yes"), steps s915 and s920 are repeated and if the changes are not above threshold ("No"), process 900 is ended. In other words, node rank can also be considered as a model of execution behavior. For example, a program execution can be viewed as a set of node visits in a certain execution. At any point, the program execution may stop and another program execution may start with another node. The c then can be seen as a probability that an execution would stop at a specific node and that a new execution would start with a new node.

For the purpose of ranking the alerts, the Node Centrality $NR(B_a)$ for a node is normalized between (0,1) using equation (6) below:

$$NR(ba)^N = \frac{1}{1 + e^{-\sigma(NR(Ba)-\mu)}}, \quad (6)$$

where σ is a smoothing factor and u is a predefined rank objective.

As a result, alert node rank estimator 435 provides a measure of the relative importance of an alert location.

Referring back to FIG. 4, a paths total alerts score estimator 440 determines a number of other alerts in the alert execution paths. This measure is included because it can break the chain of a defect and facilitate easier understanding and resolution of other alerts in the paths. However, having too many alerts to review can also make it more difficult to comprehend and fix the underlying defects. Therefore, in one implementation, an alert path count score S is determined using a Gaussian normalization function defined by equation (7) below:

$$S_{a_n} = \frac{1}{\sqrt{2\pi\sigma^2}} e^{-\frac{(c(a)-\mu)^2}{2\sigma^2}}, \quad (7)$$

where c(a) is the count of alerts in the path of an alert $a_i^k$, variance α and expected value σ are computed in a way to increase the score for a reasonable number of alerts in a path (e.g., 3) and to decrease the score after a pre-determined threshold (e.g., 6) is reached—for example, a threshold representing a large number for one analyst to address in one review.

Finally, as shown in FIG. 4, an alert type specific score estimator 440 provides a score according to a type of each alert (e.g., $a_0 \ldots a_n$) comprised in static analysis results 405. According to one implementation, security s, quality q, and accuracy l are respectively determined over a numeric range [e.g., 0-1] that capture specific characteristics of an alert type. For example, if an alert type is related more to security than performance, s would be higher than q. The accuracy l measure captures the effectiveness of a tool (e.g., an SCA tool used to generate static analysis results 405) (not shown) at detecting a particular type of alerts. This effectiveness can be in terms of accuracy or precision.

According to one embodiment and as illustrated in FIG. 4, the three values related to the tool are configuration inputs 445 to alert type specific score estimator 440. In embodiments, these value inputs 445 can be based on historic data or expert knowledge related to respective SCA tools used for generating results 405. Using the configuration inputs 445, the alert type specific score estimator 440 generates an alert score by type according to equation (8) below:

$$a^k = w * s + w * q + w * l, \quad (8)$$

where 3*w equals 1, and k represent the alert type.

Once the above information has been determined, alert metric generator 400 computes combined metrics of the alerts—alert score measures 450 shown in FIG. 4—in accordance with equation (9) below:

$$R(a_n^k) = a^k + NR(a) + LE(a) + \ln(1 + EEF(a)) + Prb(a) + S_{a_n}) \quad (9)$$

Figure 10:
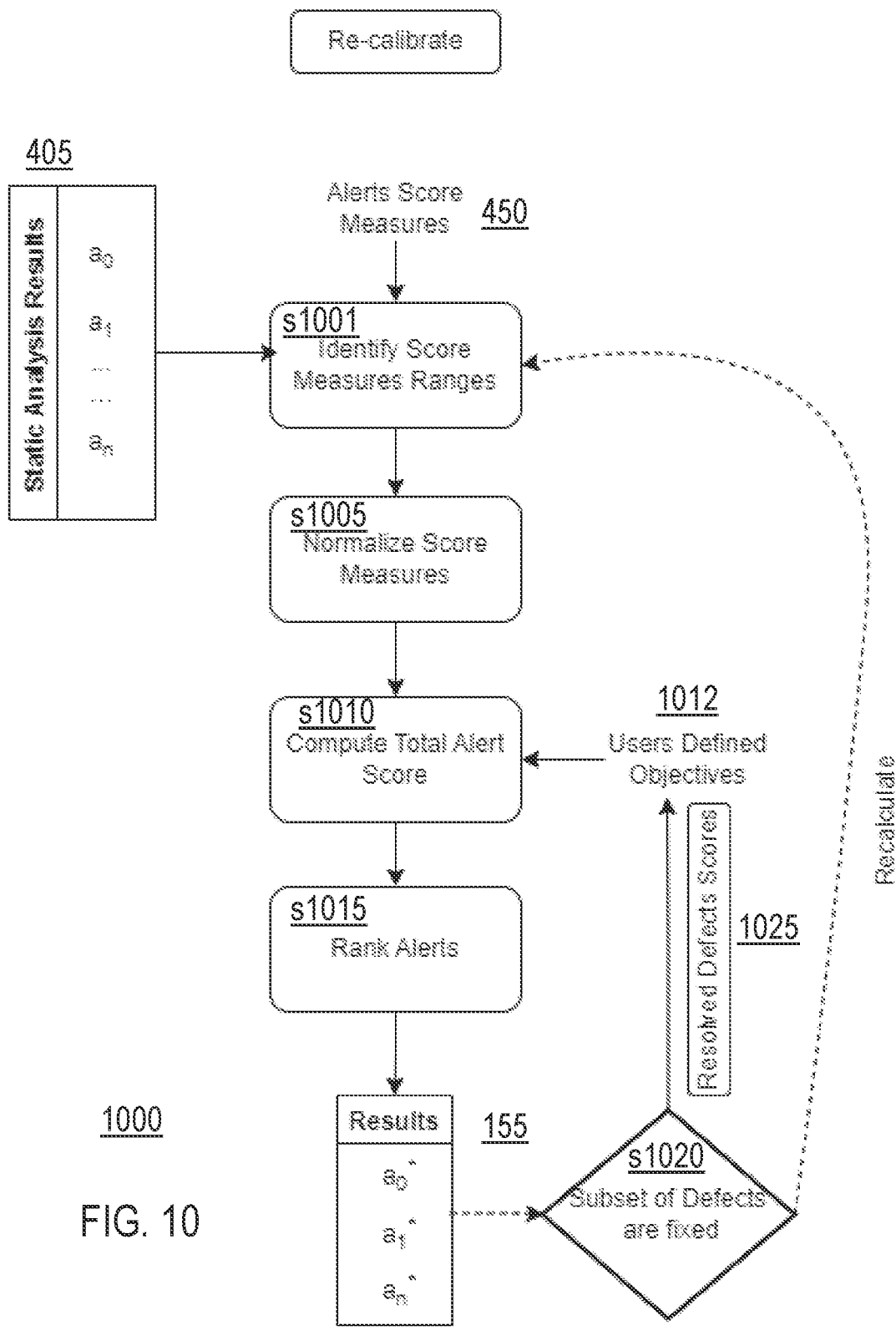
FIG. 10 is a flow diagram of an alert ranking process that corresponds to a metrics normalization step and a ranking step of the process shown in FIG. 1 according to one example implementation of the present disclosure.

FIG. 10 is a flow diagram of an alert ranking process 1000, which corresponds to metrics normalization step s115 and ranking step s120 of process 100 shown in FIG. 1, according to one example implementation of the present disclosure.

As illustrated in FIG. 10, process 1000 initiates with step s1001 of obtaining alerts score measures 450 corresponding to SCA results 405 from the completion of the alert metric computations by alert metric generator 400 and identifying a range of the obtained alerts score measures 450. Once a range is determined, at step s1005, a logarithmic scale is used to normalize the values of alert score measures 450 outputted by alert metric generator 400 that are larger than one. In embodiments, other normalization and scaling methods can be used.

Next, at step s1010, a total alert score is computed using the normalized alert score measures. In embodiments, the total alert score computation takes into account user defined objectives 1012, such as a user-defined parameter (for example, 0.75), condition, and the like.

Once the total alert score is computed, at step s1015, a final rank among the alerts is determined and output as results 155 (corresponding to results 155 shown in FIG. 1 and described above).

Advantageously, the final rank 155 based on the alert score measures 450 captures the different competing objectives that analysts and quality assurance analysts face during their manual inspection. The resulting ranked list of alerts balances between ensuring that alerts in critical areas of an application are covered and increases the number of actionable alerts for the analysts.

Additionally, to adaptively address any ranking changes that can occur after fixes and changes for some alerts included in results 155 have been applied, process 1000 returns to step s1001 after the completion, at step s1020, of correcting a subset of defects (or resolving a number of alerts) (e.g., #10 of defects or alerts) listed in results 155 to, thereby, recalculate and update new rankings for the remaining unfixed (unresolved) alerts in results 155. In embodiments, step s1020 can happen after any number of alerts being fixed and can be automatically triggered after the fix is implemented so that the underlying code is compiled and built again.

As further illustrated in FIG. 10, process 1000 comprises adaptive recalibration ("recalibrate") of the system with every fix being committed according to an example embodiment. After parameterizing/initializing the ranker for producing results 155, the rank of the actual results and the corresponding measures need to be assessed frequently to ensure that results 155 accurately represent the actual objectives and are re-calibrated to reflect remaining issues based on relative importance. Thus, according to one implementation, a comparison process is performed for pre-resolution and post-resolution codes to obtain resolved defects scores 1025 after a subset (any number) of issues are fixed, which are used to update user defined objectives 1012 to reflect the remaining issues after the fixes and the score of previously fixed items are considered.

Figure 11:
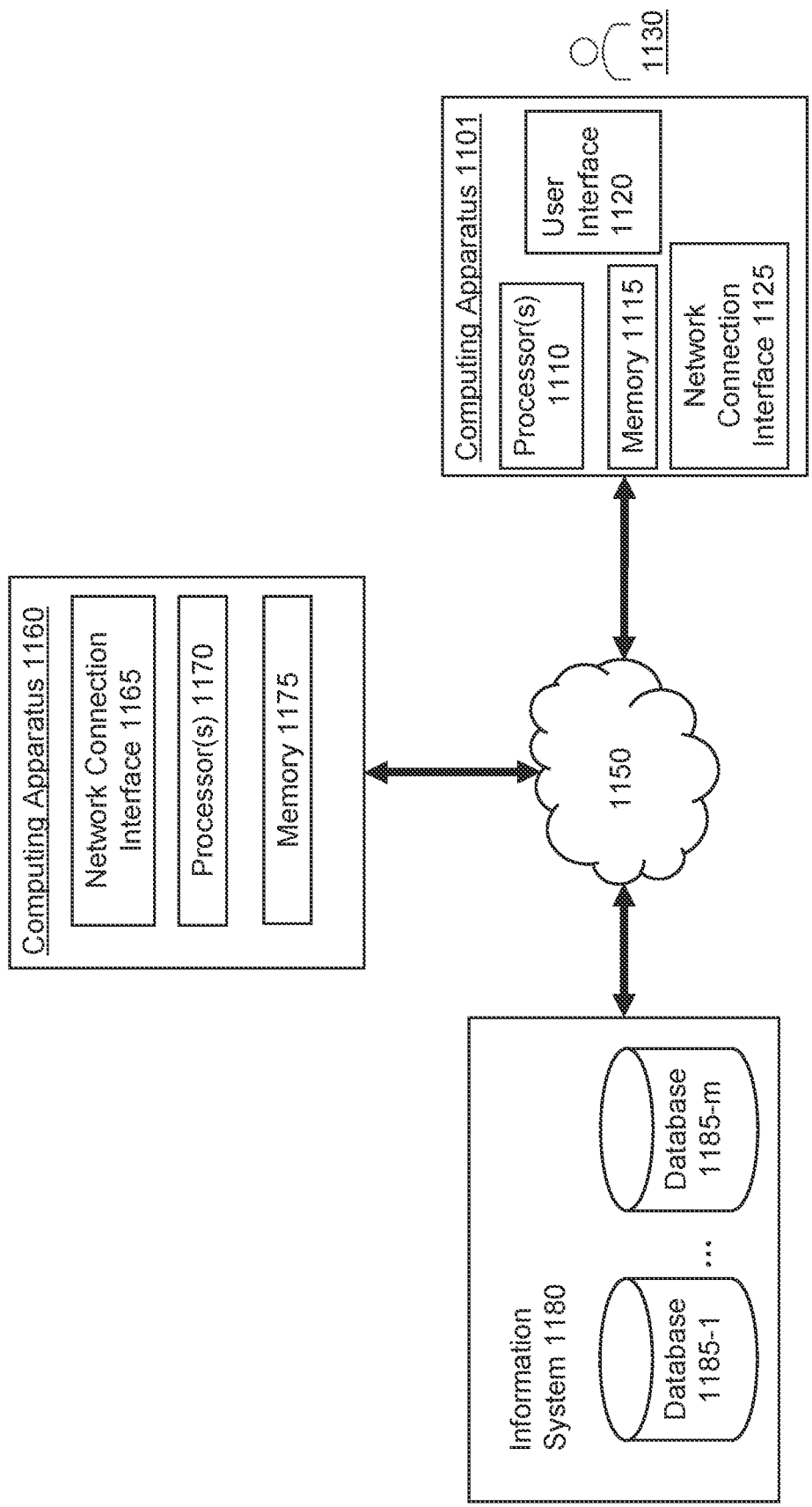
FIG. 11 is a schematic diagram illustrating a system for implementing the code graph representation generator of FIG. 2, the system dependence graph generator of FIG. 3, and the alert metric generator of FIG. 4, and for executing the processes of FIGS. 1 and 5-10 according to example implementations of the present disclosure.

FIG. 11 is a schematic diagram illustrating a system 1100 for implementing code graph representation generator 200 and alert metric generator 400 and for executing code analysis and alert ranking process 100, as well as processes 500, 600, 700, 800, 900, and 1000 according to example implementations of the present disclosure. In one example embodiment, system 1100 comprises computing apparatus 1101, which can be any computing device and/or data processing apparatus capable of embodying the systems and/or methods described herein and can include, for one or more corresponding users (1130), any suitable type of electronic device including, but are not limited to, a workstation, a desktop computer, a mobile computer (e.g., laptop, ultrabook), a mobile phone, a portable computing device, such as a smart phone, tablet, personal display device, personal digital assistant ("PDA"), virtual reality device, wearable device (e.g., watch), to name a few, with network access that is uniquely identifiable by Internet Protocol (IP) addresses and Media Access Control (MAC) identifiers. comprised of one or more processor(s) 1110, a memory 1115, a user interface 1120, and a network connection interface 1125 for communicatively connecting to a network 1150.

One or more processor(s) 1110 can include any suitable processing circuitry capable of controlling operations and functionality of computing apparatus 1101, as well as facilitating communications between various components within computing apparatus 1101. In some embodiments, processor(s) 1110 can include a central processing unit ("CPU"), a graphic processing unit ("GPU"), one or more microprocessors, a digital signal processor, or any other type of processor, or any combination thereof. In some embodiments, the functionality of processor(s) 1110 can be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 1110 can include its own local memory, which can store program systems, program data, and/or one or more operating systems. Thus, one or more components of code graph representation generator 200 and alert metric generator 400 can be embodied by one or more program applications executed by processor(s) 1110 and/or embodied in conjunction with instructions stored in memory 1115. Likewise, code analysis and alert ranking process 100, as well as processes 500, 600, 700, 800, 900, and 1000 can be executed, at least in part, by processor(s) 1110, instructions and data (including, e.g., source code 101) for which can be stored in any one or more of memory 1115, memory 1175, and information system 1180.

Memory 1115 can include one or more types of storage mediums, such as any volatile or non-volatile memory, or any removable or non-removable memory implemented in any suitable manner to store data for computing apparatus 1101. For example, information can be stored using computer-readable instructions, data structures, and/or program systems. Various types of storage/memory can include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, memory 1115 can be implemented as computer-readable storage media ("CRSM"), which can be any available physical media accessible by processor(s) 910 to execute one or more instructions stored within memory 1115. According to an exemplary embodiment, one or more applications and data for implementing code graph representation generator 200 and alert metric generator 400 and for executing code analysis and alert ranking process 100, as well as processes 500, 600, 700, 800, 900, and 1000 described above are stored in memory 1115 and executed by processor(s) 1110.

User interface 1120 is operatively connected to processor(s) 1110 and can include one or more input or output device(s), such as switch(es), button(s), key(s), a touch screen, a display, mouse, microphone, camera(s), sensor(s), etc. as would be understood in the art of electronic computing devices. Thus, an operator or developer 1130 can interact with computing apparatus 1101 via user interface 1120 to obtain the prioritization results (e.g., 155) for one or more alerts generated by corresponding one or more automated code analysis tools. According to one embodiment, operator 1130 identifies source code 101 to be analyzed via user interface 1120 and executes one or more application programs that implement code graph representation generator 200 and alert metric generator 400, and/or that execute code analysis and alert ranking process 100, as well as processes 500, 600, 700, 800, 900, and 1000 which return results 155 to operator 1130 via user interface 1120. Correspondingly, results 155 can be stored in memory 1115 and/or communicated via network connection interface 1125 through network 1150—for example, to computing apparatus 1160 or information system 1180.

Network connection interface 1125 can use any suitable data communications protocols. According to an exemplary embodiment, network connection interface 1125 comprises one or more universal serial bus ("USB") ports, one or more Ethernet or broadband ports, and/or any other type of hardwire access port to communicate with network 1150 and, accordingly, computing apparatus 1160 and information system 1180. In some embodiments, computing apparatus 1101 can include one or more antennas to facilitate wireless communications with a network using various wireless technologies (e.g., Wi-Fi, Bluetooth, radiofrequency, etc.). In embodiments, computing apparatus 1101 can access network 1150 via a virtual private network ("VPN") tunnel through an external network (not shown). Such tunnels can employ Layer 2 Tunneling Protocol (L2TP) and the like.

Communications systems for facilitating network 1150 include hardware (e.g., hardware for wired and/or wireless connections) and software. Wired connections can use coaxial cable, fiber, copper wire (such as twisted pair copper wire), and/or combinations thereof, to name a few. Wired connections can be provided through Ethernet ports, USB ports, and/or other data ports to name a few. Wireless connections can include Bluetooth, Bluetooth Low Energy, Wi-Fi, radio, satellite, infrared connections, ZigBee communication protocols, to name a few. In embodiments, cellular or cellular data connections and protocols (e.g., digital cellular, PCS, CDPD, GPRS, EDGE, CDMA2000, 1×RTT, RFC 1149, Ev-DO, HSPA, UMTS, 3G, 4G, LTE, 5G, and/or 6G to name a few) can be included.

Communications interface hardware and/or software, which can be used to communicate over wired and/or wireless connections, can include Ethernet interfaces (e.g., supporting a TCP/IP stack), X.25 interfaces, T1 interfaces, and/or antennas, to name a few. Accordingly, network 1150 can be accessed, for example, using Transfer Control Protocol and Internet Protocol ("TCP/IP") (e.g., any of the protocols used in each of the TCP/IP layers) and suitable application layer protocols.

According to an exemplary embodiment of the present disclosure, network 1150 is a secure, private, enterprise network comprised of switches (not shown), routers (not shown), and other computing devices (not shown) for facilitating communications and data exchanges among servers, such as computing apparatus 1160 and information system 1180, and clients, such as computing apparatus 1101, while conforming to the above-described connections and protocols as understood by those of ordinary skill in the art.

In embodiments, data communications and exchanges among the elements of network 1150 can be encrypted. In embodiments, network 1150 can be embodied by one or more private shared IP networks, corporate shared packet networks, Storage Area Networks (SAN), and/or dedicated communications conduits or circuits based on dedicated channels, such as Synchronous Digital Hierarchy (SDH), Synchronous Optical Networking SONET, Wave Division Multiplexing, dedicated cable, Digital Subscriber Line (DSL), dedicated fiber, or various forms of other non-shared IP packet networks as understood by those of ordinary skill in the art.

In an exemplary embodiment, computing apparatus 1160 serves an application server to computing apparatus 1101 for hosting one or more applications—for example, those associated with the implementation of the above-described code graph representation generator 200 and alert metric generator 400 and for executing code analysis and alert ranking process 100, as well as processes 500, 600, 700, 800, 900, and 1000—that are accessible and executable over network 1150 by authorized users (e.g., 1130) at computing apparatus 1101. In accordance with an exemplary embodiment, computing apparatus 1160 includes network connection interface 1165, processor(s) 1170, and memory 1175. Network connection interface 1165 can use any of the previously mentioned exemplary communications protocols for communicatively connecting to network 1150. Exemplary implements of network connection interface 1165 can include those described above with respect to network connection interface 1125, which will not be repeated here. One or more processor(s) 1170 can include any suitable processing circuitry capable of controlling operations and functionality of computing apparatus 1160, as well as facilitating communications between various components within computing apparatus 1160. Exemplary implements of processor(s) 1170 can include those described above with respect to processor(s) 1010, which will not be repeated here. Memory 1175 can include one or more types of storage mediums, such as any volatile or non-volatile memory, or any removable or non-removable memory implemented in any suitable manner to store data for computing apparatus 1160, exemplary implements of which can include those described above with respect to memory 1115 and will be not repeated here. In embodiments, executable portions of applications maintained at computing apparatus 1160 can be offloaded to computing apparatus 1101. For example, user interface renderings and the like can be locally executed at computing apparatus 1101.

Information system 1180 incorporates databases 1185-l . . . 1185-m that embodies servers and corresponding storage media for storing data associated with, for example, the implementation of the above-described code graph representation generator 200 and alert metric generator 400 and for executing code analysis and alert ranking process 100, as well as processes 500, 600, 700, 800, 900, and 1000 which can be accessed over network 1150 as will be understood by one of ordinary skill in the art. Exemplary storage media for the database(s) 1185 correspond to those described above with respect to memory 1115, which will not be repeated here. According to an exemplary embodiment, information system 1180 incorporates databases 1185-l . . . 1185-m and can incorporate any suitable database management system. Information system 1180 incorporates a network connection interface (not shown) for communications with network 1150 and exemplary implements of which can include those described above with respect to network connection interface 1125, which will not be repeated here. Thus, data and code associated with the above-described code graph representation generator 200 and alert metric generator 400 and for executing code analysis and alert ranking process 100, as well as processes 500, 600, 700, 800, 900, and 1000 can be maintained and updated at information system 1180 via network access at computing apparatus 1101 by operator 1130. The processes can be executed at any one or more of computing apparatus 1101, computing apparatus 1160, and information system 1180.

EXAMPLES

Example 1

Table 1 below includes an example excerpt for source code 101 that is input for the analysis steps s105, s105a, and s105b of process 100 shown in FIG. 1 and implemented using system 200 according to one example implementation of the present disclosure.

TABLE 1

```
Code →
public static void main(String[ ] args) {
    //statments
    int T = in.nextInt ( ) ;
    int [ ] a = new int[T] ;
    for (int j = 0 ; j < T ; j ++)
    a[ j ] = in.nextInt ( ) ;
    int c = 0 ;
    for (int j = 0 ; j < T ; j ++)
    if (a[ j ] == j+1)
    c ++ ;
    System.out.println("Case"+i+":"+((double)T−(double)c));
```

Figure 12:
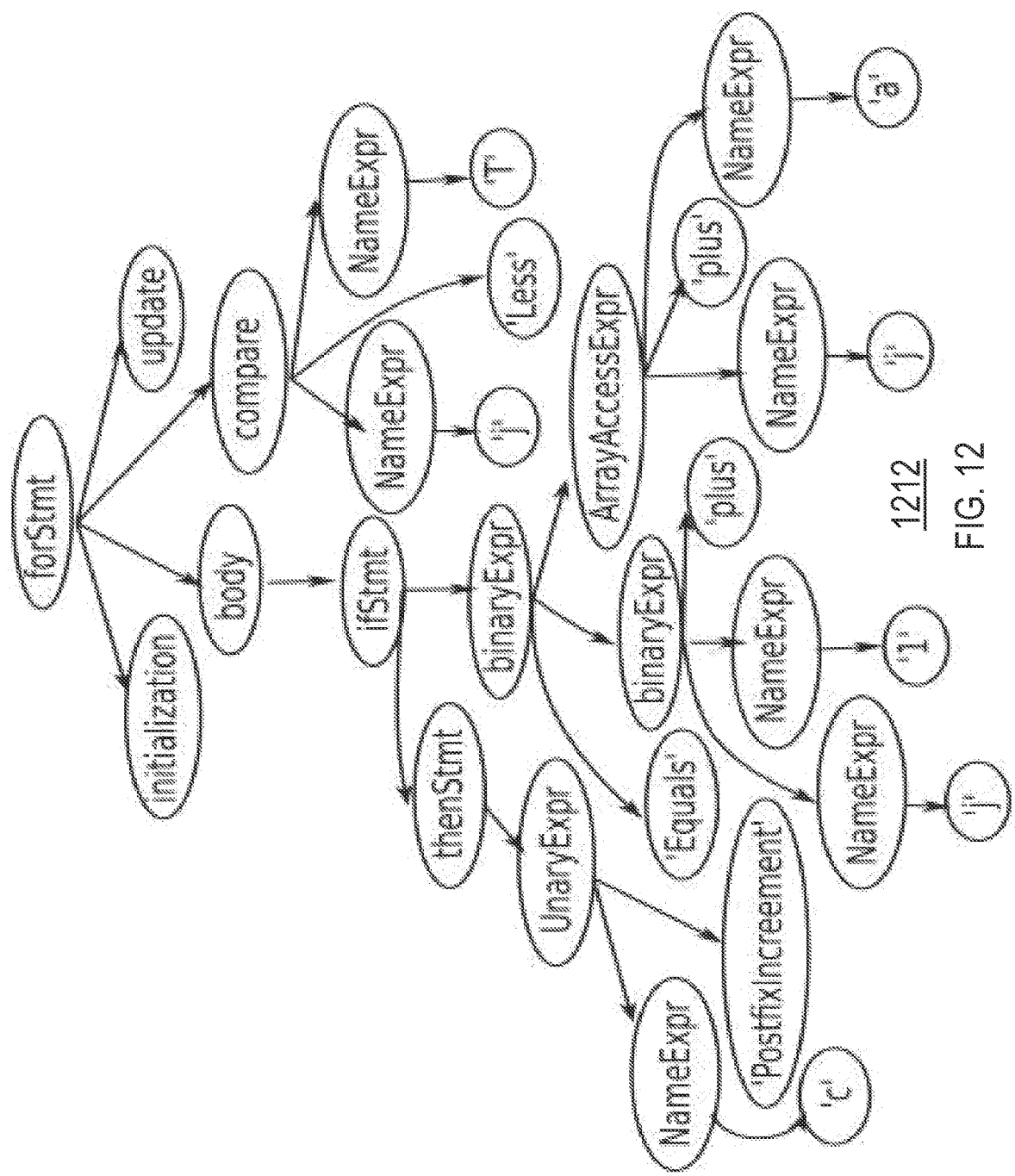
FIG. 12 is an illustration of an Abstract Syntax Tree (AST) that is generated from an example code excerpt according to an example implementation of the present disclosure.

FIG. 12 is an illustration of an Abstract Syntax Tree 1212 (corresponding to AST 212 illustrated in FIG. 2 and described above) that is generated from the code excerpt of Table 1 by tokens parser 210 according to an example implementation of the present disclosure.

Figure 13:
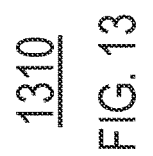
FIG. 13 is an illustration of an example Control Flow Graph (CFG) that is generated using the AST of FIG. 12.

FIG. 13 is an illustration of a Control Flow Graph (CFG) 1310 (corresponding to CFG 310 illustrated in FIG. 3 and described above) that is generated by CFG generator 215 (or SDG Generator 225) using the AST 1212 in the manner described with reference to FIGS. 2 and 3 above.

As shown in FIG. 13, CFG 1310 comprises a flow from "start" to "end" among five basic block nodes (b0, b1, b2, b3, and b4) with directed edges based on unconditional jumps between b0->b1, b1->b2, and b2->b3. Additionally, CFG 1310 comprises a conditional jump made up of directed edges between b3->b4 and b3->b2 in correspondence with the description above with reference to control flow graph (CFG) generator 215 shown in FIG. 2.

Figure 14:
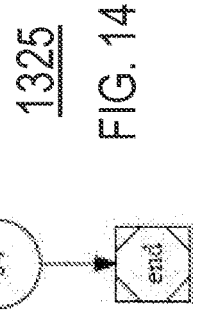
FIG. 14 is an illustration of an example Program Dependence Graph (PDG) that is generated using the CFG of FIG. 13.

FIG. 14 is an illustration of a Program Dependence Graph (PDG) 1325 (corresponding to PDG 325 illustrated in FIG. 3 and described above) that is generated by PDG Generator 220 (or SDG Generator 225) using CFG 1310 in the manner described with reference to FIGS. 2 and 3 above.

As shown in FIG. 14, PDG 1325 retains the control flow ("C") of CFG 1310 and is augmented with data dependencies ("D") between nodes b0->b4, b1->b4, and b2->b4.

Example 2

FIGS. 15A, 15B, and 15C are illustrations of branch probabilities, $EEF(b_n)$, and $Prb(b_n)$, respectively, that are computed for an example PDG (corresponding to PDG 325) in the manner described above with reference to FIGS. 4, 5, and 6.

More specifically, FIG. 15A shows a PDG 1425 augmented with branch probabilities that are computed by alert execution paths enumerator 410 in the manner described above. As illustrated in FIG. 15A, the branch probabilities are: 0.7 for b0->b1, 0.3 for b0->b2, 1.0 for b1->b4 and b2->b3, 0.85 for b3->b3, and 0.15 for b3->b4 for PDG 1425.

FIG. 15B shows the results of EEF computations for PDG 1425 according to process 500 described above. As shown in FIG. 15B, the EEF are 1 for b0, 0.7 for b1, 0.3 for b2, 2 for b3 and 1 for b4.

FIG. 15C shows the results of node and edge Prb computations for PDG 1425 according to process 600 described above. As shown in FIG. 15C, branch probabilities correspond to those of FIG. 15A and the node Prb are 1 for b0, 0.7 for b1, 0.3 for b2, 0.3 for b3, and 1 for b4.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). To facilitate understanding, like reference numerals have been used, where possible, to designate like elements common to the figures. In certain instances, a letter suffix following a dash ( . . . -b) denotes a specific example of an element marked by a particular reference numeral (e.g., 210-b). Description of elements with references to the base reference numerals (e.g., 210) also refer to all specific examples with such letter suffixes (e.g., 210-b), and vice versa.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof, and are meant to encompass the items listed thereafter and equivalents thereof as well as additional items.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting.

While the disclosure has described several example implementations, it will be understood by those skilled in the art that various changes can be made, and equivalents can be substituted for elements thereof, without departing from the spirit and scope of the disclosure. In addition, many modifications will be appreciated by those skilled in the art to adapt a particular instrument, situation, or material to embodiments of the disclosure without departing from the essential scope thereof. Therefore, it is intended that the disclosure not be limited to the particular embodiments disclosed, or to the best mode contemplated for carrying out this disclosure, but that the disclosure will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope encompassed by the present disclosure, which is defined by the set of recitations in the following claims and by structures and functions or steps which are equivalent to these recitations.

What is claimed is:

1. A computing apparatus, comprising:
   one or more processors; and
   a memory having stored therein machine-readable instructions that, when executed by the one or more processors, cause the one or more processors to:
   obtain, from a user via a user interface, an identification of computer code for analysis;

retrieve, from a memory storage device, the computer code based on the identification obtained from the user;

generate an abstract program representation of the retrieved computer code;

conduct execution behavior analysis of the computer code using the abstract program representation to generate a graphical representation of execution behavior for the computer code;

obtain a plurality of alerts generated from one or more automated static code analysis processes that are performed on the computer code;

compute respective alert metrics for the plurality of alerts using the abstract program representation and the graphical representation of execution behavior;

rank the plurality of alerts by the computed alert metrics;

output, to the user via the user interface, a ranked list of the plurality of alerts;

resolve at least one of the plurality of alerts based on the ranked list;

recalibrate at least one of the respective alert metrics for remaining one or more of the plurality of alerts;

update the ranked list upon determining that a subset of the ranked list of the plurality of alerts has been resolved; and output, to the user via the user interface, the updated rank list.

2. The computing apparatus of claim 1, wherein for generating the abstract program representation, the machine-readable instructions, when executed by the one or more processors, cause the one or more processors to:

convert the retrieved computer code to a stream of source code text;

tokenize the converted text stream into a plurality of tokens;

assign respective context indicators to the tokens; and generate an abstract syntax tree using the tokens with the assigned context indicators, said abstract syntax tree representing the abstract program representation.

3. The computing apparatus of claim 1, wherein for the execution behavior analysis, the machine-readable instructions, when executed by the one or more processors, cause the one or more processors to:

determine a control flow of the retrieved computer code using the abstract program representation to generate one or more control flow graphs;

identify one or more data dependencies among a plurality of nodes in the one or more control flow graphs to generate corresponding one or more program dependence graphs; and generate a code graph representation of a system associated with the retrieved computer code using the one or more program dependence graphs, said code graph representation being used as the graphical representation of execution behavior to compute the respective alert metrics.

4. The computing apparatus of claim 3, wherein the code graph representation is generated using one or more call graphs derived from an abstract syntax tree comprised in the abstract program representation.

5. A computing apparatus, comprising:

one or more processors; and a memory having stored therein machine-readable instructions that, when executed by the one or more processors, cause the one or more processors to:

obtain, from a user via a user interface, an identification of computer code for analysis;

retrieve, from a memory storage device, the computer code based on the identification obtained from the user;

generate an abstract program representation of the retrieved computer code;

conduct execution behavior analysis of the computer code using the abstract program representation to generate a graphical representation of execution behavior for the computer code;

obtain a plurality of alerts generated from one or more automated static code analysis processes that are performed on the computer code;

compute respective alert metrics for the plurality of alerts using the abstract program representation and the graphical representation of execution behavior;

rank the plurality of alerts by the computed alert metrics;

output, to the user via the user interface, a ranked list of the plurality of alerts; and for computing the respective alert metrics, the machine-readable instructions, when executed by the one or more processors, cause the one or more processors to:

compute one or more possible execution paths for each of the plurality of alerts;

estimate an execution frequency for each node of the graphical representation of execution behavior;

estimate an execution probability for each node of the graphical representation of execution behavior using the computed one or more possible execution paths;

locate respective nodes containing the plurality of alerts on the graphical representation of execution behavior;

compute a complexity indicator for each of the plurality of alerts using the estimated execution frequencies and the estimated execution probabilities for the respective nodes containing the plurality of alerts on the graphical representation of execution behavior;

determine an importance measure for each of the respective nodes containing the plurality of alerts;

count a number of other alerts on each execution path for the plurality of alerts;

assign an alert type score to each of the plurality of alerts; and compute the respective alert metrics by combining the estimated execution frequencies, the estimated execution probabilities, the complexity indicators, the importance measures, the count numbers of other alerts, and the alert type scores for the plurality of alerts.

6. The computing apparatus of claim 5, wherein for determining the importance measure for each of the respective nodes containing the plurality of alerts, the machine-readable instructions, when executed by the one or more processors, cause the one or more processors to:

proceed, starting with a fractional share rank and a null rank and in an iterative or recursive manner, to:

equally share an old rank of each of the respective nodes containing the plurality of alerts with every linked node of the respective node, and add a supplemental share rank to every node, for a next iteration until relative ranks among the respective nodes containing the plurality of alerts and the linked nodes are unchanged between iterations; and output normalized ranks for the respective nodes containing the plurality alerts for the importance measure.

7. The computing apparatus of claim 5, wherein for assigning the alert type score to each of the plurality of alerts, the machine-readable instructions, when executed by the one or more processors, cause the one or more processors to:

determine a security measure, a quality measure, and an accuracy measure related to the one or more static code analysis processes from which the plurality of alerts are obtained; and generate the alert type score by combining the security measure, the quality measure, and the accuracy measure for each of the plurality of alerts.

8. The computing apparatus of claim 5, wherein for computing the one or more possible execution paths for each of the plurality of alerts, the machine-readable instructions, when executed by the one or more processors, cause the one or more processors to:

generate a backwards slice for each of the plurality of alerts;

enumerate the generated slices according to locations of the plurality of alerts and a parameter that identifies at least one node with an influence on a value of the parameter at each of the locations; and output the one or more possible execution paths in an ordered list of one or more nodes for each of the plurality of alerts.

9. A method, comprising:

obtaining, from a user via a user interface by a computing apparatus configured by executing machine-readable instructions, an identification of computer code for analysis;

retrieving, from a memory storage device by the computing apparatus, the computer code based on the identification obtained from the user;

generating, by the computing apparatus, an abstract program representation of the retrieved computer code;

conducting, by the computing apparatus, execution behavior analysis of the computer code using the abstract program representation to generate a graphical representation of execution behavior for the computer code;

obtaining, by the computing apparatus, a plurality of alerts generated from one or more automated static code analysis processes that are performed on the computer code;

computing, by the computing apparatus, respective alert metrics for the plurality of alerts using the abstract program representation and the graphical representation of execution behavior;

ranking, by the computing apparatus, the plurality of alerts by the computed alert metrics; and outputting, to the user via the user interface by the computing apparatus, a ranked list of the plurality of alerts;

resolving, by the computing apparatus, at least one of the plurality of alerts based on the ranked list;

recalibrating, by the computing apparatus, at least one of the respective alert metrics for remaining one or more of the plurality of alerts;

updating, by the computing apparatus, the ranked list upon determining that a subset of the ranked list of the plurality of alerts has been resolved; and outputting, to the user via the user interface by the computing apparatus, the updated rank list.

10. The method of claim 9, further comprising, for generating the abstract program representation:

converting, by the computing apparatus, the retrieved computer code to a stream of source code text;

tokenizing, by the computing apparatus, the converted text stream into a plurality of tokens;

assigning, by the computing apparatus, respective context indicators to the tokens; and generating, by the computing apparatus, an abstract syntax tree using the tokens with the assigned context indicators, said abstract syntax tree representing the abstract program representation.

11. The method of claim 9, further comprising, for the execution behavior analysis:

determining, by the computing apparatus, a control flow of the retrieved computer code using the abstract program representation to generate one or more control flow graphs;

identifying, by the computing apparatus, one or more data dependencies among a plurality of nodes in the one or more control flow graphs to generate corresponding one or more program dependence graphs; and generating, by the computing apparatus, a code graph representation of a system associated with the retrieved computer code using the one or more program dependence graphs, said code graph representation being used as the graphical representation of execution behavior to compute the respective alert metrics.

12. The method of claim 11, wherein the code graph representation is generated using one or more call graphs derived from an abstract syntax tree comprised in the abstract program representation.

13. A method, comprising:

obtaining, from a user via a user interface by a computing apparatus configured by executing machine-readable instructions, an identification of computer code for analysis;

retrieving, from a memory storage device by the computing apparatus, the computer code based on the identification obtained from the user;

generating, by the computing apparatus, an abstract program representation of the retrieved computer code;

conducting, by the computing apparatus, execution behavior analysis of the computer code using the abstract program representation to generate a graphical representation of execution behavior for the computer code;

obtaining, by the computing apparatus, a plurality of alerts generated from one or more automated static code analysis processes that are performed on the computer code;

computing, by the computing apparatus, respective alert metrics for the plurality of alerts using the abstract program representation and the graphical representation of execution behavior;

ranking, by the computing apparatus, the plurality of alerts by the computed alert metrics; and outputting, to the user via the user interface by the computing apparatus, a ranked list of the plurality of alerts; and for computing the respective alert metrics:

computing, by the computing apparatus, one or more possible execution paths for each of the plurality of alerts;

estimating, by the computing apparatus, an execution frequency for each node of the graphical representation of execution behavior;

estimating, by the computing apparatus, an execution probability for each node of the graphical representation of execution behavior using the computed one or more possible execution paths;

locating, by the computing apparatus, respective nodes containing the plurality of alerts on the graphical representation of execution behavior;

computing, by the computing apparatus, a complexity indicator for each of the plurality of alerts using the estimated execution frequencies and the estimated execution probabilities for the respective nodes containing the plurality of alerts on the graphical representation of execution behavior;

determining, by the computing apparatus, an importance measure for each of the respective nodes containing the plurality of alerts;

counting, by the computing apparatus, a number of other alerts on each execution path for the plurality of alerts;

assigning, by the computing apparatus, an alert type score to each of the plurality of alerts; and computing, by the computing apparatus, the respective alert metrics by combining the estimated execution frequencies, the estimated execution probabilities, the complexity indicators, the importance measures, the count numbers of other alerts, and the alert type scores for the plurality of alerts.

14. The method of claim 13, further comprising, for determining the importance measure for each of the respective nodes containing the plurality of alerts:

proceeding, by the computing apparatus, starting with a fractional share rank and a null rank and in an iterative or recursive manner, to:

equally share an old rank of each of the respective nodes containing the plurality of alerts with every linked node of the respective node, and add a supplemental share rank to every node, for a next iteration until relative ranks among the respective nodes containing the plurality of alerts and the linked nodes are unchanged between iterations; and outputting, by the computing apparatus, normalized ranks for the respective nodes containing the plurality alerts for the importance measure.

15. The method of claim 13, further comprising, for assigning the alert type score to each of the plurality of alerts:

determining, by the computing apparatus, a security measure, a quality measure, and an accuracy measure related to the one or more static code analysis processes from which the plurality of alerts are obtained; and generating, by the computing apparatus, the alert type score by combining the security measure, the quality measure, and the accuracy measure for each of the plurality of alerts.

16. The method of claim 13, further comprising, for computing the one or more possible execution paths for each of the plurality of alerts, generating, by the computing apparatus, a backwards slice for each of the plurality of alerts;

enumerating, by the computing apparatus, the generated slices according to locations of the plurality of alerts and a parameter that identifies at least one node with an influence on a value of the parameter at each of the locations; and outputting, by the computing apparatus, the one or more possible execution paths in an ordered list of one or more nodes for each of the plurality of alerts.

* * * * *